US011019596B2

(12) United States Patent
Starsinic et al.

(10) Patent No.: US 11,019,596 B2
(45) Date of Patent: May 25, 2021

(54) KEEPING THE UE AWAKE

(71) Applicant: Convida Wireless, LLC, Wilmington, DE (US)

(72) Inventors: Michael F. Starsinic, Newtown, PA (US); Catalina Mihaela Mladin, Hatboro, PA (US); Rocco Di Girolamo, Laval (CA); Hongkun Li, Malvern, PA (US); Chonggang Wang, Princeton, NJ (US); Zhuo Chen, Claymont, DE (US); Dale N. Seed, Allentown, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 16/385,021

(22) Filed: Apr. 16, 2019

(65) Prior Publication Data

US 2019/0246374 A1 Aug. 8, 2019

Related U.S. Application Data

(62) Division of application No. 15/678,725, filed on Aug. 16, 2017, now Pat. No. 10,306,591.
(Continued)

(51) Int. Cl.
*H04W 4/02* (2018.01)
*H04W 68/02* (2009.01)
(Continued)

(52) U.S. Cl.
CPC ....... *H04W 68/02* (2013.01); *H04W 52/0209* (2013.01); *H04W 52/0216* (2013.01);
(Continued)

(58) Field of Classification Search
CPC . H04W 68/02; H04W 76/045; H04W 76/048; H04W 88/02; H04W 4/005; H04W 80/06; H04W 76/046
See application file for complete search history.

(56) References Cited

U.S. PATENT DOCUMENTS 9,516,116 B2  12/2016 Santamaria et al.
9,699,725 B1   7/2017 Chamarty et al.
(Continued)

FOREIGN PATENT DOCUMENTS

EP       3018946 A1   5/2016
KR  10-2012-0005135 A  1/2012
(Continued)

OTHER PUBLICATIONS

3GPP TS 23.799, V0.4.0; Technical Specification Group Services and System Aspects; Study on Architecture for Next Generation System (Release 14), Apr. 2016, 96 pages (Year: 2016).*
(Continued)

*Primary Examiner* — Lan-Huong Truong
(74) *Attorney, Agent, or Firm* — BakerHostetler

(57) ABSTRACT

When mobile terminated devices sleep, the devices might not be reachable when needed, for instance when the device is a recipient of data from a third party server. As described herein, a third party application server may inform the network that it has data to send to a particular UE or group of UEs. In an example, the mobile core network (MCN) may use information from the third party server to ensure that the UE is awake when it needs to be. For example, a given UE or group of UEs can be prevented from entering a sleep state before a data transfer is completed.

16 Claims, 15 Drawing Sheets

Related U.S. Application Data

(60) Provisional application No. 62/375,695, filed on Aug. 16, 2016.

(51) Int. Cl.

| | | |
|---|---|---|
| *H04W 52/02* | (2009.01) | |
| *H04W 76/25* | (2018.01) | |
| *H04W 4/70* | (2018.01) | |
| *H04W 76/28* | (2018.01) | |
| *H04W 76/27* | (2018.01) | |
| *H04W 80/06* | (2009.01) | |
| *H04W 88/02* | (2009.01) | |

(52) U.S. Cl.
CPC ... *H04W 52/0219* (2013.01); *H04W 52/0225* (2013.01); *H04W 76/25* (2018.02); *H04W 4/70* (2018.02); *H04W 76/27* (2018.02); *H04W 76/28* (2018.02); *H04W 80/06* (2013.01); *H04W 88/02* (2013.01); *Y02D 30/70* (2020.08)

(56) References Cited

U.S. PATENT DOCUMENTS

| | | |
|---|---|---|
| 2004/0229626 A1 | 11/2004 | Yi et al. |
| 2006/0258291 A1 | 11/2006 | Nakata et al. |
| 2008/0144605 A1 | 6/2008 | Qiu et al. |
| 2009/0046627 A1 | 2/2009 | Xu |
| 2012/0207070 A1 | 8/2012 | Xu et al. |
| 2014/0029570 A1 | 1/2014 | Lee et al. |
| 2014/0219184 A1 | 8/2014 | Makharia et al. |
| 2015/0003311 A1 | 1/2015 | Feuersaenger et al. |
| 2016/0044089 A1 | 2/2016 | Agarwal |
| 2016/0081022 A1* | 3/2016 | Haneji .............. H04W 52/0229 370/311 |
| 2016/0149673 A1 | 5/2016 | Shiroshima |
| 2016/0337426 A1 | 11/2016 | Shribman et al. |
| 2016/0353356 A1 | 12/2016 | Payyappilly et al. |
| 2016/0353453 A1* | 12/2016 | Au ..................... H04W 74/006 |
| 2017/0257430 A1 | 9/2017 | Atia et al. |
| 2017/0325130 A1* | 11/2017 | Purohit ............. H04W 36/0005 |

FOREIGN PATENT DOCUMENTS

| | | |
|---|---|---|
| KR | 10-1195796 B1 | 11/2012 |
| KR | 10-2015-0113046 A | 10/2015 |
| WO | 2008/144605 A1 | 11/2008 |
| WO | 2015/200801 A1 | 12/2015 |
| WO | 2016/050075 A1 | 4/2016 |

OTHER PUBLICATIONS

Next Generation Mobile Network (MGMN) Alliance, Description of Network Slicing Concept; www.ngmn.org/uploads/media/160113_Network_Slicing_v1_0.pdf, Jan. 2016, 7 pages.

Network Functions Virtualisation—Introductory White Paper, Oct. 22-24, 2012, "SDN and OpenFlow World Congress,", Darmstadt Germany, https://portal.etsi.org/nfv/nfv_white_paper.pdf, 16 pages.

ETSI GS NFV 002, V1.2.1, Network Functions Virtualization (NFV); Architectural Framework, http://www.etsi.org/deliver/etsi_gs/nfv/001_099/022/01.01.01_60/gs_nfv002v010101p.pdf, Dec. 2014, 21 pages.

3rd Generation Partnership Project; 3GPP TS 36.413, V12.1.0; Technical Specification Group Radio Access Network; Evolved Universal Terrestrial Radio Access Network (E-UTRAN); S1 Application Protocol (S1AP) (Release 12), Mar. 2014, 285 pages.

3rd Generation Partnership Project; 3GPP TS 23.682, V11.4.0; Technical Specification Group Services and System Aspects; Architecture Enhancements to Facilitate Communications with Packet Data Networks and Applications (Release 11), Jun. 2013, 29 pages.

3rd Generation Partnership Project; 3GPP TS 23.401, V12.8.0; Technical Specification Group Services and System Aspects; General Packet Radio Service (GPRS) Enhancements for Evolved Universal Terrestrial Radio Access Network (E-UTRAN) Access (Release 12), Mar. 2015, 308 pages.

3rd Generation Partnership Project; 3GPP TR 23.799, V0.4.0, Technical Specification Group Services and System Aspects; Study on Architecture for Next Generation System (Release 14), Apr. 2016, 96 pages.

3rd Generation Partnership Project: 3GPP TS 23.203, V13.4.0; Technical Specification Group Services and System Aspects; Policy and Charging Control Architecture (Release 13), Jun. 2015, 235 pages.

\* cited by examiner

1102

Low Power Modes have been disabled by the network for 5 minutes due to an impending data transfer by an Application Server.

The Device has been paged and Low Power Modes have been disabled by the network for 5 minutes due to an impending data transfer by an Application Server.

FIG. 11B

KEEPING THE UE AWAKE

CROSS REFERENCE TO RELATED APPLICATIONS

This application is a divisional of U.S. patent application Ser. No. 15/678,725 filed Aug. 16, 2017 which claims the benefit of U.S. Provisional Patent Application Ser. No. 62/375,695 filed Aug. 16, 2016 the disclosures of which is hereby incorporated by reference as if set forth in their entirety herein.

BACKGROUND

3GPP supports several features that enable a user equipment (UE) to sleep for longer periods in order to conserve power. Power Savings Mode (PSM) and extended Idle Mode DRX (eDRX) are features that allow the UE to sleep for relatively long periods of time. While in a "Sleep" state, a given UE typically does not listen for pages from the network, and thus the UE is unreachable for mobile terminated (MT) communications. Extended S-GW buffering is a feature where MT data that targets a UE that is in a long sleep period can be buffered in the S-GW until the UE is listening to the network. Reachability Notifications is a feature that allows a service capability server or application server (SCS/AS) to be notified when the UE is available for MT communications.

Power Savings Mode (PSM) is a UE state that was introduced in 3GPP Release 12. The PSM feature is defined in 3GPP TS 23.682 ("Architecture enhancements to facilitate communications with packet data networks and applications") and sections 4.3.22 and 4.3.5.2 of 3GPP TS 23.401 ("General Packet Radio Service (GPRS) enhancements for Evolved Universal Terrestrial Radio Access Network (E-UTRAN) access").

The objective of the Power Saving Mode (PSM) feature is to reduce power consumption at the UE. A UE under PSM mode is similar to power-off, but the UE remains registered with the network and there is no need to re-attach or re-establish PDN connections. The PSM feature introduces a new timer called 'Active Time', which indicates the time during which the UE remains reachable before going to PSM. The UE starts the Active Time when it transitions to idle mode, and is available for any mobile terminated requests during Active Time. When the Active timer expires, the UE deactivates its Access Stratum functions and enters PSM. In PSM, due to the deactivation of Access Stratum functions, the UE stops idle mode procedures, but continues to run any NAS timers that may apply (e.g. the periodic TAU timer).

Generally, when a UE supports PSM, it indicates to the CN that it wants to use PSM by providing an Active Time value during the Attach or TAU/RAU procedures. If the network supports PSM and wants to allow the UE to use PSM, it confirms usage of PSM by allocating an Active Time Value to the UE. The network determines the Active Time by considering the UE's requested value, and network configuration and policies. In some cases, if the UE wishes to modify the Active Time value, then the UE requests the value it wants in the next periodic TAU/RAU procedure. The UE remains in PSM mode until a mobile originated event (e.g., periodic RAU/TAU, mobile originated data or detach) requires the UE to initiate any procedure towards the network.

Typically, PSM is intended to be used for UEs that are expecting infrequent mobile originating and terminating services, and for UEs that can accept a corresponding latency in the mobile terminating communication. This implies that any application that wants to use PSM needs to request an Active Time that is long enough to allow for potential mobile terminated service or data delivery.

Turning to extended discontinuous reception (DRX), a UE that is using extended Idle Mode DRX (Extended DRX or eDRX) has longer time periods between paging occasions (POs). At each paging occasion, the UE listens to the network for a page. A page indicates to the UE that the network may have data to send to the UE, so its RRC connection should be activated so that it can receive data. Assuming that the UE is not paged, the UE may enter a sleep state (reduced power consumption) in between paging occasions. In some cases, the time between eDRX paging occasions may be configured to be as long as approximately 45 minutes.

The UE may request to use eDRX during an attach or tracking area update (TAU) procedure. The attach or TAU request may be used by the UE to request to use specific eDRX parameters. The network may respond by accepting the UE's eDRX parameters, rejecting the UE's request to use eDRX, or accepting the UE's request to use eDRX while providing different eDRX parameters.

In some cases, an S-GW may support extended buffering of MT Data when a UE is using sleep modes, such as PSM or eDRX for example. The S-GW may buffer MT data until the UE exits PSM (by performing a TAU) or until the UE's next paging occasion. The SCEF may provide API's to the SCS/AS. The API's may allow the SCS/AS to configure the S-GW's use of extended buffering for a UE. For example, the API's may allow the SCS/AS to configure how many MT packets may be buffered, and how long the packets should remain in the buffer before being discarded. Alternatively, for example, the UE's use of extended S-GW buffering may be configured in the UE's subscription information by the network operator. Currently, when an SCS/AS sends a packet to a UE and the packet is stored in the S-GW buffer, the SCS/AS receives no acknowledgement (or confirmation) from the MCN that the packet is in the buffer.

Turning now to Reachability Notifications, the SCEF may expose API's to the SCS/AS that allow the SCS/AS to request to be notified when the UE is reachable or will soon become reachable. For example, the MCN may notify the SCS/AS when the UE attaches, exits PSM by performing a TAU, or when the UE's paging occasion is approaching. If an SCS/AS uses reachability notifications to coordinate its communication with a UE, it may avoid the use of PSM. Reachability notifications are further described in TS 23.682.

The SCEF may expose API's to the SCS/AS that allow the SCS/AS to schedule, or negotiate, a background data transfer with the MCN. The API may allow the SCS/AS to indicate the number of UE's in the transfer, the volume of data that will be sent, and geographic location of the UE's. The MCN may then provide the SCS/AS with a time when the data transfer may be performed. Background data transfers are described further in TS 23.682 and 3GPP TS 23.203 ("Policy and charging control architecture").

Turning now to current approaches to retransmissions in transport layer and application layer protocols, some transport layer protocols may require that some packets be acknowledged. For example, transmission control protocol (TCP) is a protocol that requires that the recipient of a packet send an acknowledgement. If the sender does not receive an acknowledgement within a timeout period (e.g., 1 second), then the sender will retransmit the packet. The sender may increase the size of the timeout and continue attempting to send the packet until it receives an acknowledgement. The TCP allows the receiver to identify packets that have been received in duplicate so that duplicate packets can be discarded. In some cases, a sender does not need to wait for a packet to be acknowledged before sending another packet; multiple packets may be in transit at the same time.

CoAP is an example of an application layer protocol that may be configured so that some packets must be acknowledged. Similar to TCP, CoAP may be configured to have a timeout period, after which unacknowledged packets will be retransmitted. The CoAP protocol also allows the receiver to identify packets that have been received in duplicate so that duplicate packets can be discarded. In some cases, a sender does not need to wait for a packet to be acknowledged before sending another packet; multiple packets may be in transit at the same time.

Referring to FIG. 1, an example overview of Network Functions Virtualization (NFV) is depicted. By way of an overview, NFV aims to transform the way that network operators architect networks. In particular, IT virtualization technology is being used to consolidate many network equipment types onto industry standard high volume servers, switches and storage, which can be located in data centers, network nodes, and in the end user premises. Network functions (e.g., mobility management, session management, QoS) can be implemented in software, and the network functions can run on a range of industry standard server hardware. The functions can be moved to, or instantiated in, various locations in the network as required, without the need for installation of new equipment. FIG. 1 illustrates one example of an architectural framework for NFV that has been provided by ETSI.

It is recognized herein that NFV may be applied to any data plane packet processing and control plane function in mobile and fixed networks. Examples include, presented without limitation:

Switching elements (e.g., BNG, CG-NAT, routers)
Mobile network nodes (e.g., HLR/HSS, MME, SGSN, GGSN/PDN-GW, RNC, eNodeB)
Functions contained in home routers and set top boxes to create virtualized home environments
Converged and network-wide functions (e.g., AAA servers, policy control, and charging platforms
Application-level optimization (e.g., CDNs, Cache Servers, Load Balancers, Application Accelerators)
Security functions (e.g., firewalls, virus scanners, intrusion detection systems, spam protection It is recognized herein that applying NFV may provide various benefits to network operators, which may contribute to dramatic changes in the telecommunications industry landscape. For example, and without limitation, it is recognized herein that NFV may provide for:

Reduced equipment costs and reduced power consumption through consolidating equipment and exploiting the economies of scale of the IT industry.
Increased velocity of Time to Market by minimizing the typical network operator cycle of innovation.
The possibility of running production, test and reference facilities on the same infrastructure provides more efficient testing and integration, reducing development costs and time to market.
Targeted service introduction based on geography or customer sets. Services can be rapidly scaled up/down as required.
The enablement of a wide variety of eco-systems (encouraging openness).
Optimized network configuration and/or topology in near real time based on the actual traffic/mobility patterns and service demand.
The support of multi-tenancy, thereby allowing network operators to provide tailored services and connectivity for multiple users, applications, internal systems, or other network operators, which may co-existing on the same hardware with appropriate secure separation of administrative domains.
Reduced energy consumption by exploiting power management features in standard servers and storage, as well as workload consolidation and location optimization.

FIG. 2 is an example (from ETSI GS NFV 002) of an end-to-end Network Service with VNFs and nested forwarding graphs. FIG. 2 illustrates the concept of a Virtualized Network Function Forwarding Graph (VNF-FG). A VNF-GW describes how a set of VNF's are connected to provide a service.

Network Slicing, such as described in the Next Generation Mobile Network (NGMN) Alliance, "Description of Network Slicing Concept", is a mechanism that can be used by mobile network operators to support multiple virtual networks behind the air interface across the fixed part of the mobile operator's network (both backhaul and core network). This involves 'slicing' the network into multiple virtual networks to support different RANs or different service types running across a single RAN. Network slicing enables the operator to create networks that are customized to provide optimized solutions for different market scenarios that demand diverse requirements, for example, in the areas of functionality, performance, and isolation. FIG. 3 shows an example conceptual architecture of network slicing. It will be understood that the different types of shading in FIG. 3 indicate the different network slice instances or subnetwork slice instances.

3GPP is designing a 5G network and is considering whether to incorporate the network slicing technology, which may be a good fit for the 5G network because the 5G use cases (e.g., massive IoT, critical communications, and enhanced mobile broadband) demand very diverse and sometimes extreme requirements. The current architecture utilizes a relatively monolithic network and transport framework to accommodate a variety of services, such as, for example, mobile traffic from smart phones, OTT content, feature phones, data cards, and embedded M2M devices. It is anticipated that the current architecture is not flexible and scalable enough to efficiently support a wider range of business needs when each has its own specific set of performance, scalability, and availability requirements. Furthermore, it is recognized herein that the introduction of new network services should be made more efficient. Nevertheless, several use cases are anticipated to be active concurrently in the same operator network, thus requiring a high degree of flexibility and scalability of the 5G network.

With respect to power saving modes in the 5G network, the 5G network may support some type of power savings mode (or UE state), for example, where the UE turns off certain functions to reduce power consumption and does not listen to the Mobile Core Network (MCN) for pages. If the UE does not listen to the MCN for pages while in a power saving mode (or state) it is not reachable for mobile terminated (MT) communication.

It is recognized herein that when user equipments (UEs) are allowed to enter long periods of sleep, such as when PSM and/or eDRX are used, situations may arise in which the UE is not reachable, and the network or a third Party Server may need to contact the UE for a mobile terminated event.

SUMMARY

As described above, when mobile terminated devices sleep, the devices might not be reachable when needed, for instance when the device is a recipient of data from a third party server. As described herein, a third party application server may inform the network that it has data to send to a particular UE or group of UEs. In an example, the mobile core network (MCN) may use information from the third party server to ensure that the UE is awake when it needs to be. For example, a given UE can be prevented from entering a sleep state before a data transfer is completed.

In an example, a server may receive a message indicating a connection status associated with, for example, a mobile terminated (MT) device or UE. The message may include, for example, and without limitation, discontinuous reception (DRX) or power savings mode (PSM) timers, an active timer value, a tracking area update (TAU) timer value, or a DRX cycle length. Based on the message, the server may configure the retransmission time of a protocol to a first value. The server may send a data packet to the at least one mobile terminated device, and use the protocol to retransmit the data packet a predetermined number of times in accordance with the first value. The protocol, in some cases, may be the transmission control protocol (TCP) or constrained application protocol (CoAP). Further, the server may change the retransmission time of the protocol to a second value upon receiving data from the mobile terminated device, or upon receiving a notification from the network. Thereafter, the protocol may be used to retransmit the data packet a predetermined number of times in accordance with the second value. The notification from the network may include a timer value or an availability notification or a loss of connectivity notification. In some cases, the server may change the retransmission time back to the first value upon receiving a second notification from the network. In an example, the second notification is a loss of connectivity (of the UE) notification.

In an example embodiment, an apparatus comprises a processor, a memory, and communication circuitry. The apparatus is connected to a network via its communication circuitry, and the apparatus further comprises computer-executable instructions stored in the memory of the apparatus which, when executed by the processor of the apparatus, cause the apparatus to perform various operations. For example, the apparatus may receive a first data delivery request message that indicates at least one user equipment that will be a recipient of data during a data transfer from a third party server. The first data delivery request message may further indicate when the third party server would like to perform the data transfer. Based on the first data delivery request message, the apparatus may perform an action to ensure that the at least one UE is awake for the data transfer. In an example, the at least one user equipment is a group of user equipments, such that the action ensures that each UE in the group is awake for the data transfer at the same time as each other.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

FIGS. 11A and 11B are example graphical user interfaces in accordance with an example embodiment;

DETAILED DESCRIPTION OF ILLUSTRATIVE EMBODIMENTS

Figure 1:
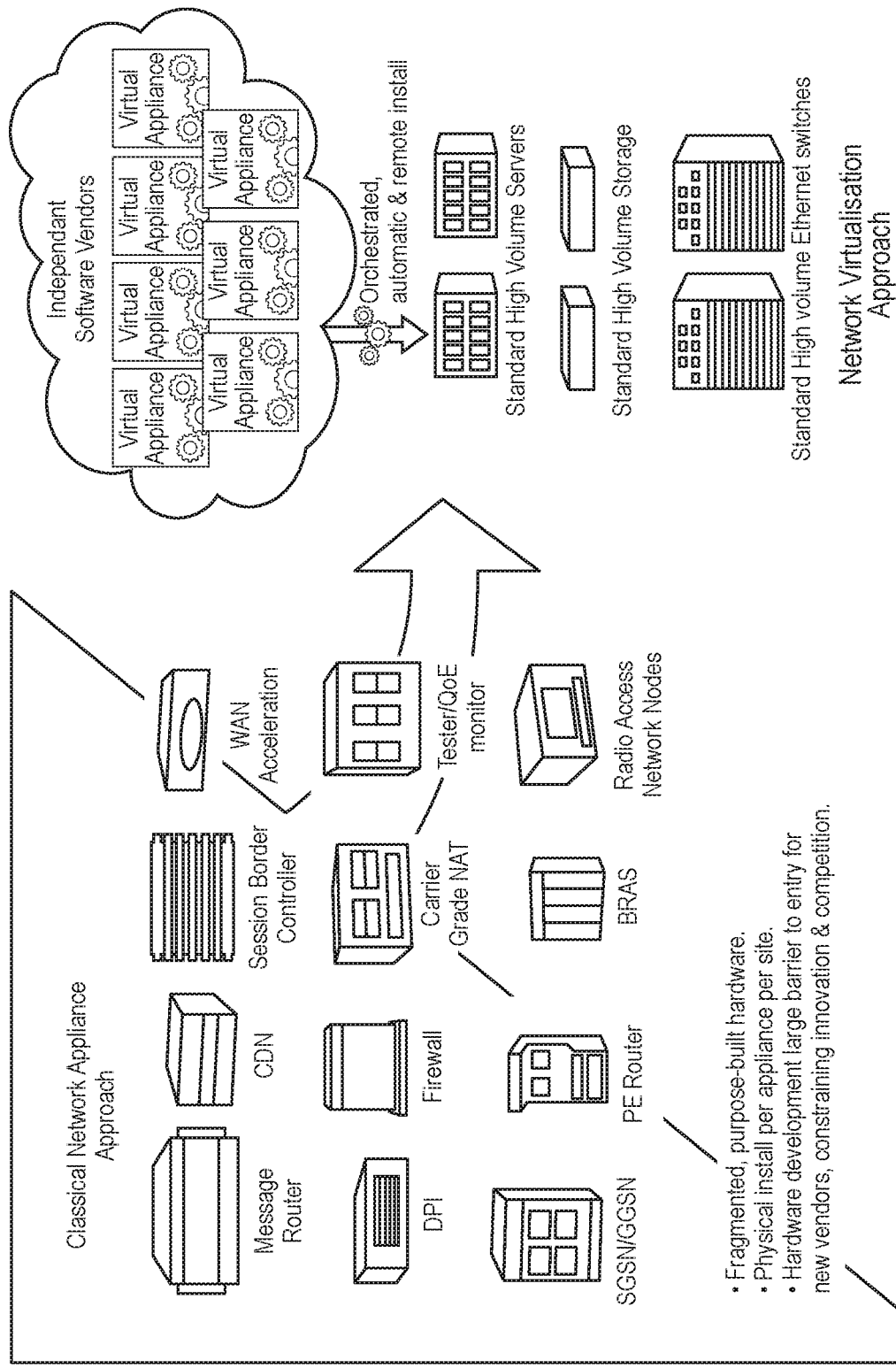
FIG. 1 is a diagram that illustrates an example architecture framework for Network Functions Virtualization (NFV), in which one or more disclosed embodiments may be implemented.
Figure 2:
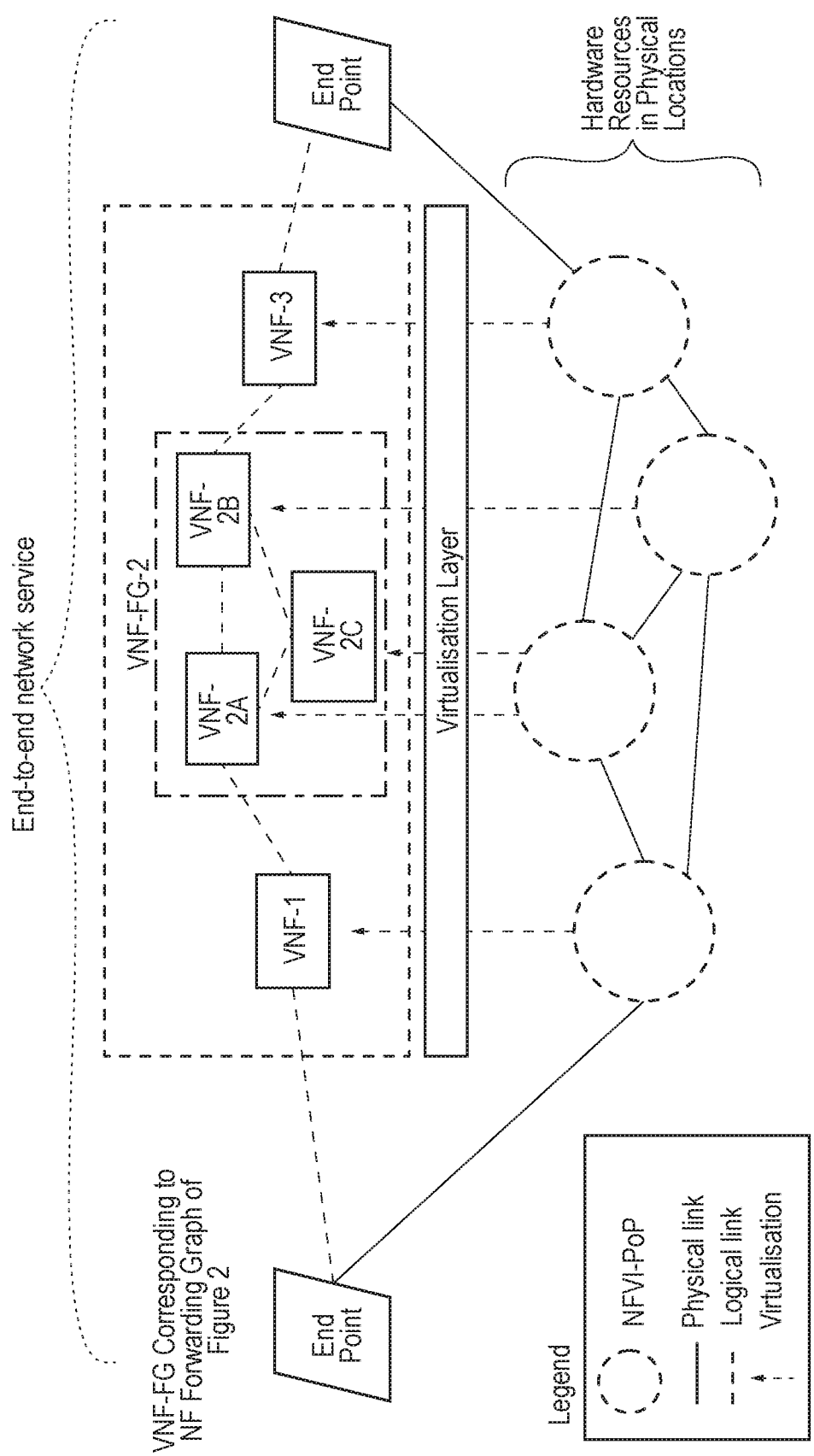
FIG. 2 is a diagram that illustrates an example of a Virtualized Network Function Forwarding Graph (VNF-FG)
Figure 3:
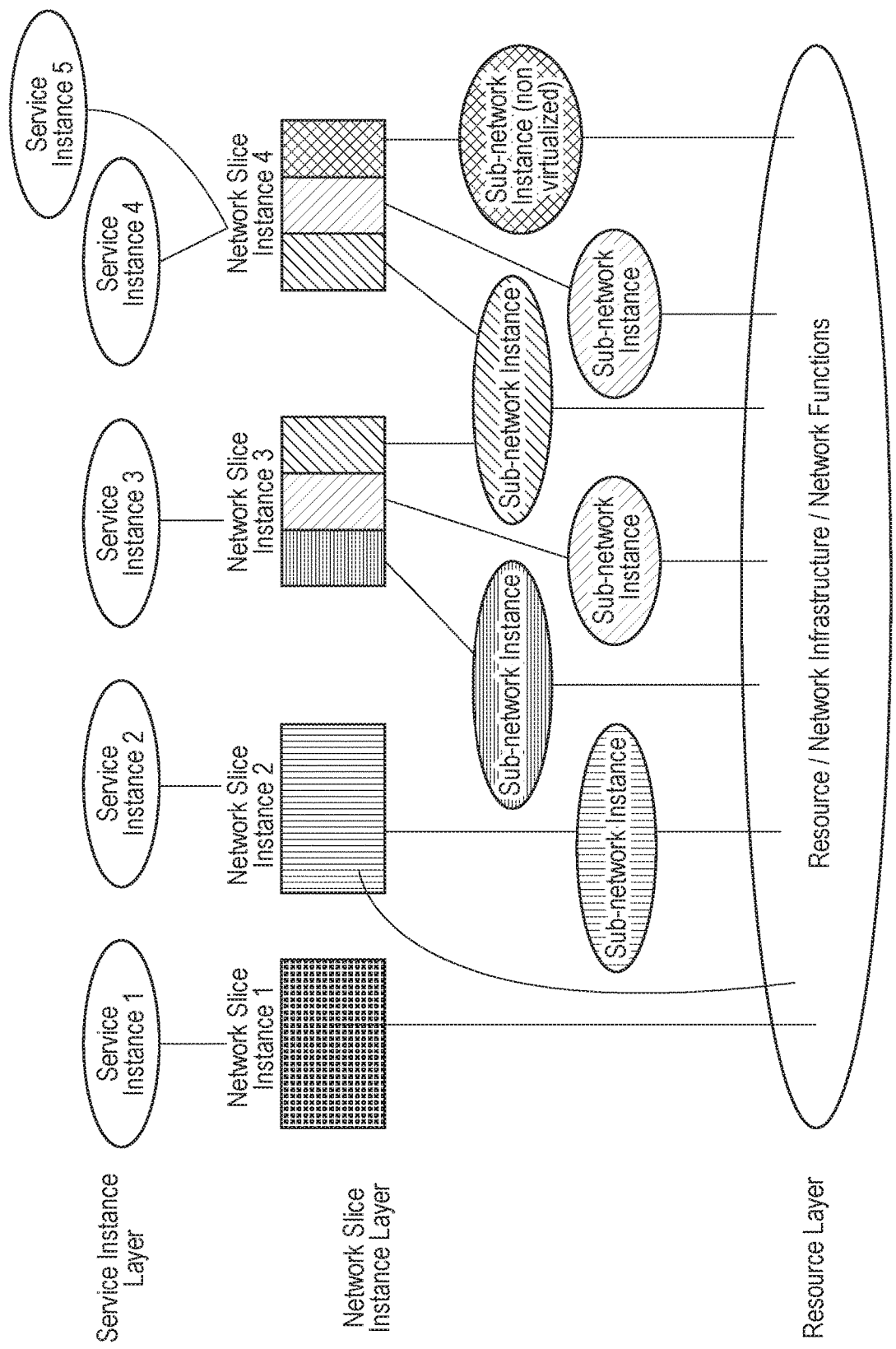
FIG. 3 is a diagram that illustrates an example architecture for network slicing, in which one or more disclosed embodiments may be implemented.

As described above, it is recognized herein that when UEs are allowed to enter long periods of sleep, such as when power savings mode (PSM) and/or extended idle mode discontinuous reception (eDRX) are used, situations may arise where the UE is not reachable when the Network or a third Party Server needs to contact the UE for a mobile terminated event.

It is recognized herein that if a third party server sends data to a UE while it is in PSM, the mobile core network may drop the data or buffer it until the UE's next paging occasion. Thus, the application, transport, and service layer protocols that are used to communicate with a UE that uses PSM should consider that the UE may be sleeping for long periods and that the MCN may be configured to buffer data that is sent to the UE. It is further recognized herein that if a third party server sends data to a UE long before its paging occasion, the mobile core network may drop the data or buffer it until the UE's next paging occasion. The application, transport, and service layer protocols that are used to communicate with a UE that uses eDRX should thus consider that the UE may be sleeping for long periods and that the MCN may be configured to buffer data that is sent to the UE.

The service layer may be functional layer within a network service architecture. Service layers are typically situated above the application protocol layer such as HTTP, CoAP or MQTT, and provide value added services to client applications. The service layer also provides an interface to core networks at a lower resource layer, such as for example, a control layer and transport/access layer. The service layer supports multiple categories of (service) capabilities or functionalities including service definition, service runtime enablement, policy management, access control, and service clustering. Recently, several industry standards bodies (e.g., oneM2M) have been developing M2M service layers to address the challenges associated with the integration of M2M types of devices and applications into deployments such as the Internet/Web, cellular, enterprise, and home networks. An M2M service layer can provide applications and/or various devices with access to a collection of, or a set of, the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs that make use of message formats, resource structures, and resource representations defined by the M2M service layer. The CSE or SCL is a functional entity that may be implemented by hardware and/or software and that provides (service) capabilities or functionalities exposed to various applications and/or devices (e.g., functional interfaces between such functional entities) in order for them to use such capabilities or functionalities.

It is also recognized herein that the application, transport, and service layer protocols that are used to communicate with a UE that uses extended S-GW buffering should consider that data sent to the UE may be buffered by the MCN in the S-GW. For example, if the S-GW is configured to buffer downlink packets for up to 30 minutes for a particular UE, then application layer retransmission timers should be tuned to account for the fact that a packet that is sent to a UE may be buffered in the S-GW for 30 minutes before the UE comes out of PSM, at which time it will be delivered to the UE. It may be inefficient to make a second transmission attempt of the same packet while the packet is still in the S-GW buffer. With respect to reachability notifications, after receiving a reachability notification, it is recognized herein that the SCS/AS might be careful to send data to the UE before it returns to the power savings state, or before the UE's eDRX paging occasion passes. Current mechanisms do not consider when and if the UEs that are involved in a transfer are using a sleep mode, such as PSM or eDRX. Further, current mechanisms do not allow the SCS/AS to indicate the identities of the specific UEs that are involved in the data transfer.

By of further background, with respect to power savings mode in WiFi, power consumption on the Wi-Fi receive path is often about a third lower as compared to the transmit path. Thus, it may be more power efficient to shut down the transmit path and only listen when no outgoing frames are present. Further power savings can be achieved by the WiFi Station (STA) when it indicates to the access point (AP) (or wireless LAN controller) that it is entering power save mode and shut down its receive path. The AP (or wireless LAN controller) stores frames destined for a given STA in power save mode, and sends them to the STA when requested to do so. During association, a given STA uses the Listen Interval parameter to indicate to the AP how many beacon intervals it shall sleep before it retrieves the queued frames from the AP. The AP might not drop any queued frames until the STA's Listen Interval elapses.

In existing approaches, a given STA may enter power-save mode by sending a Null frame to the AP with the Power Management bit set. From then on, the AP (or wireless LAN controller) stores the packets destined to the STA in a per-STA queue, and sets the TIM field in the beacon frame to indicate that packets destined for the STA have been queued at the AP. The STA may wake up from sleep every Listen Interval to receive the beacon frame and, when it detects that the TIM field for it has been set, it may send a PS-Poll frame to the AP. In response, the AP may send the first queued frame to the STA. The STA may receive the queued data frame, and if the More Data field in this frame is set, it may send another PS-Poll frame to the AP. In some cases, the STA continues to send PS-Poll frames to receive the queued frames and when none are left, it goes back to sleep until the next Listen Interval.

It is recognized herein that the above-described method is not a very efficient method of data transfer because polling is used, and polling is generally suitable for light traffic conditions. One example improvement over this method is to exit power-save mode upon detecting queued frames, by sending a Null frame with Power Management bit turned off. The AP (or wireless LAN controller) can then send the queued frames to the STA. The STA can then re-enter power-save mode by sending a Null frame with a Power Management bit turned on. For example, the STA may wait for a short period of time during which it has not received any frames from the AP (or wireless LAN controller) to deduce that there are no outstanding queued frames for it at the AP (or wireless LAN controller).

Turning now to Unscheduled Asynchronous Power Save Delivery (U-APSD), it is recognized herein that legacy power-save methods do not provide good power savings for periodic bi-directional data traffic that consists of short frames, such as VoIP for example. By way of example, the time to deduce that there are no outstanding queued frames from the AP is often much longer than the time period between successive VoIP frames, such that the STA does not go to power-save mode during the VoIP call. The U-APSD mechanism, which was formulated as part of 802.11e, is meant to address this situation better than previous approaches.

U-APSD allows for a client to schedule in advance the communication pattern between the STA and AP based on the predictable traffic pattern of VoIP calls. For example, the client can negotiate with the AP to exchange VoIP frames every 20 ms, which is typical. Once this is negotiated, the client may sleep between the packet exchanges without notifying the AP. For non-VoIP traffic, an STA retrieves unicast traffic queued in the AP by sending trigger frames. The AP may indicate support for this mechanism by advertising this capability in beacon and probe response and association/reassociation response frames.

As in legacy power-save mode, an STA may set the Power Management bit in a Null frame to indicate to the AP that it is in power-save mode. An STA in power-save mode sends a QoS Null or QoS Data frame to trigger the AP to send queued frames. The AP may acknowledge the trigger, and then follow it up with up to a negotiated maximum number of frames. In some cases, if there are no queued frames on the AP when the trigger is received, the AP will respond with a QoS NULL frame. It is recognized herein that an advantage of U-APSD over legacy power-save mode is that the exchange of frames occurs with SIFS separation, such that the medium remains locked during the exchange. In legacy power-save mode, the frames are exchanged with DIFS separation, such that other STAs can take over the medium.

Figure 4:
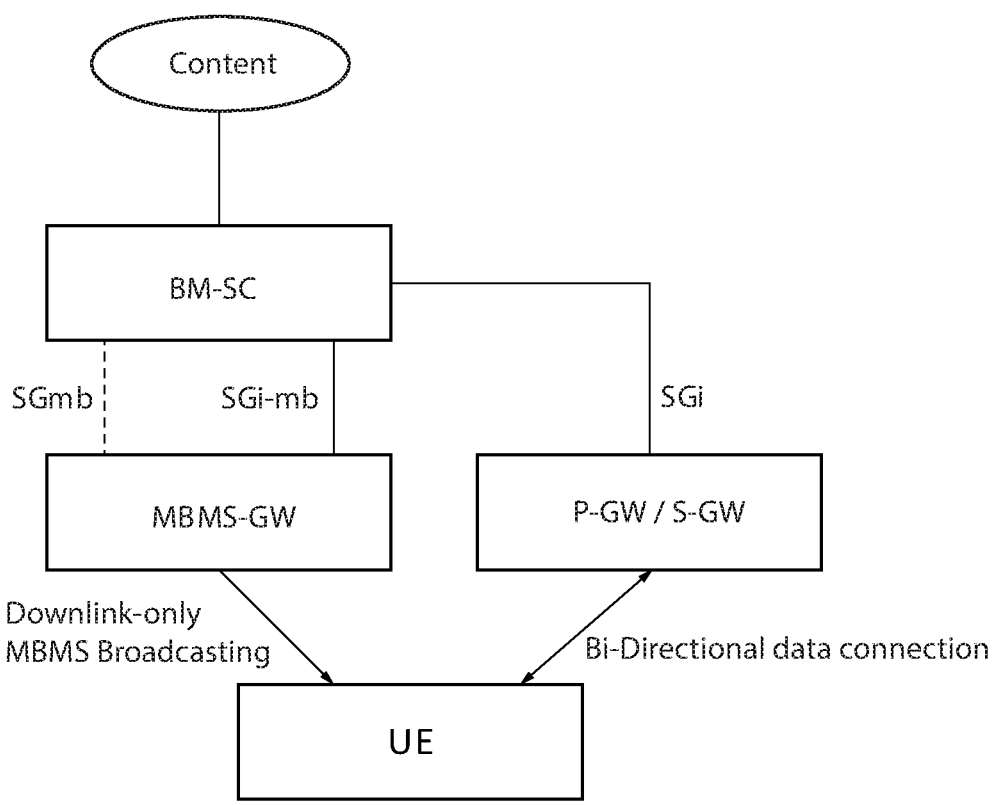
FIG. 4 shows an example BM-SC connection to the mobile network infrastructure.

Referring now to FIG. 4, an example high level Multimedia Broadcast/Multicast Service (MBMS) is shown. MBMS is described in detail in 3GPP TS 23.246. ("Multimedia/Broadcast/Multicast Service; Architecture and Functional Description), which is incorporated by reference as if its contents are set forth herein. Referring to FIG. 4, the BM-SC is the node that controls MBMS Sessions. The BM-SC initiates notifications that the MBMS will be used to broadcast specific content, and it manages functionality associated with terminals that want to join sessions. Interactions between the terminals and BM-SC is handled over normal unicast. MBMS service is user aware. For example, sessions are controlled on a per-user basis. Example functions of the BM-SC include: Service Announcement Function, Key Management Function, and Session and Transmission Function.

Figure 5:
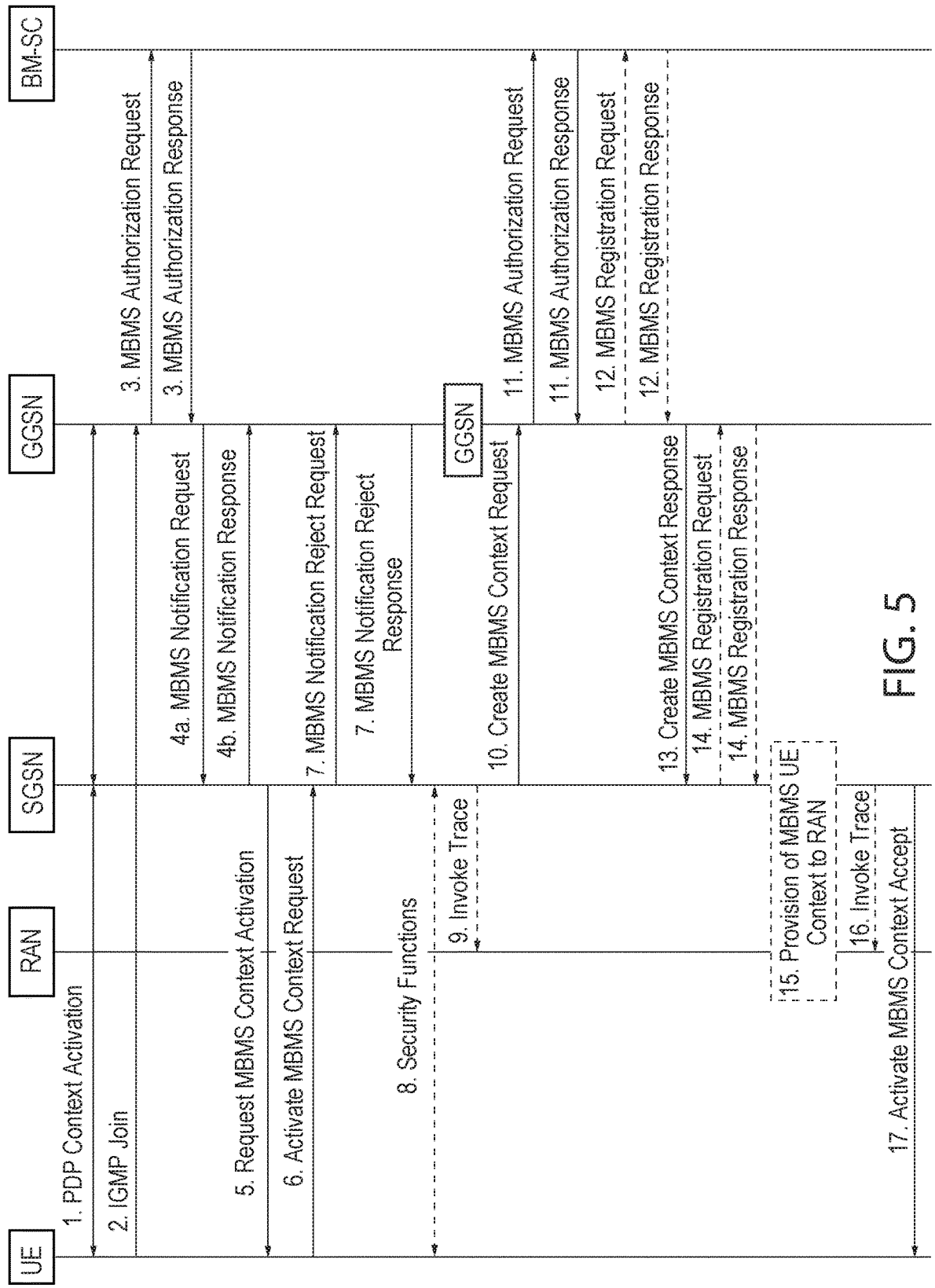
FIG. 5 is an example call flow for the activation of an MBMS multicast service.

Referring now to FIG. 5, an example is shown of how a UE activates the MBMS. At 1, the UE activates its default PDN context. At 2, the UE attempts to join the MBMS. The decision to join the group may be in response to a service advertisement that is not shown in this figure. For example, the advertisement may have been sent via WAP push, SMS, etc. In steps 3-17, the MBMS service is activated, which is described in detail in 3GPP TS 23.246.

Figure 6:
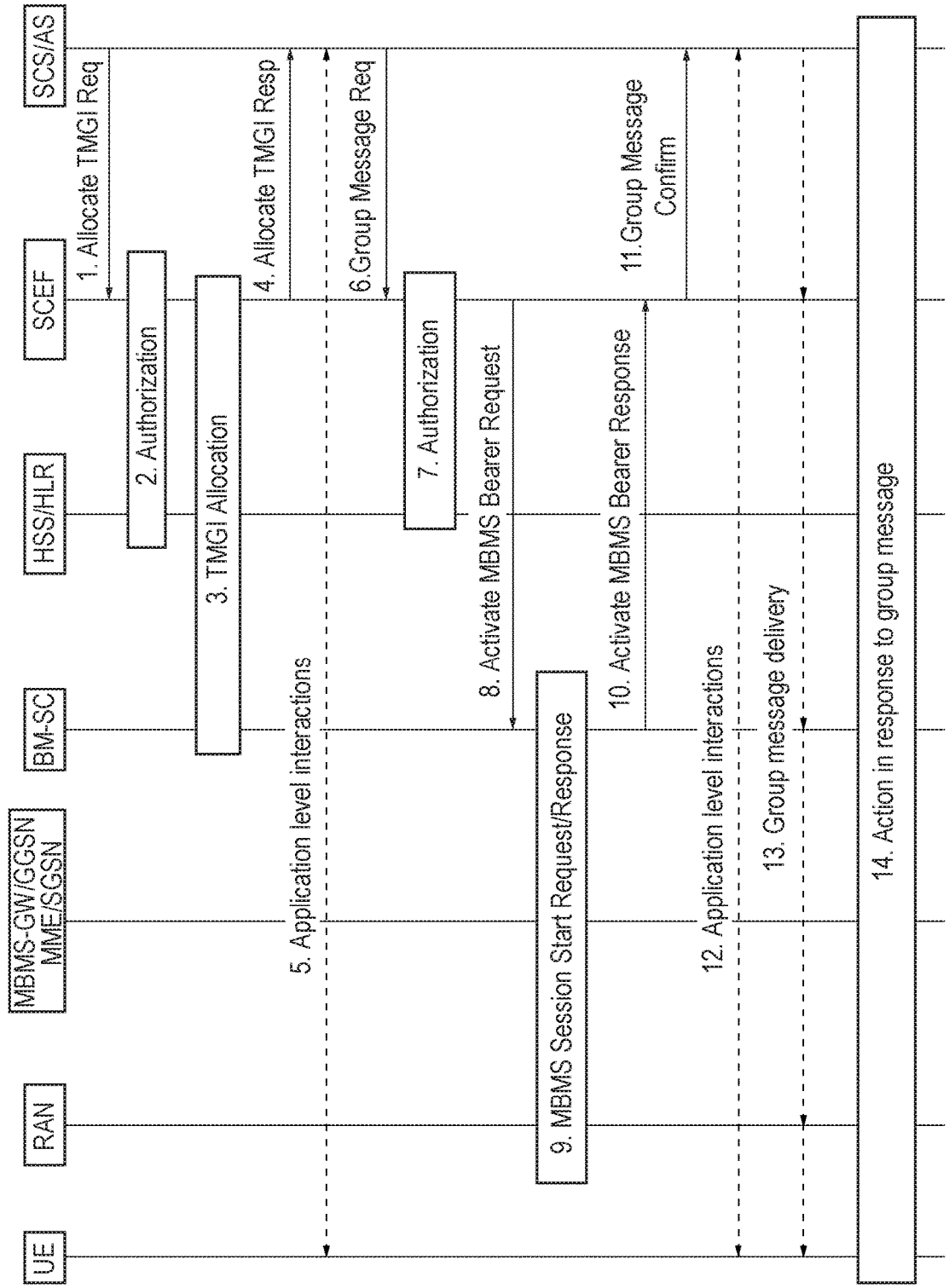
FIG. 6 is an example call flow for group message delivery using MBMS.

Referring now to FIG. 6, a services capability server (SCS) or application server (AS) (SCS/AS), which can be referred to herein as a third party server, may access the MBMS system to broadcast/multicast data via the service capability exposure function (SCEF). Referring to FIG. 6, at 5, a TMGI can be delivered to the group. The TMGI may be used by the group members to listen for a group message. At 6, the SCS/AS can inform the SCEF of the start time of the broadcast/multicast. At 13, the group message can be delivered. FIG. 6 is described in further detail in 3GPP TS 23.682, which is incorporated by reference as if its contents are set forth herein.

As described above, it is recognized herein that buffering mobile terminated (MT) data within the Mobile Core Network (MCN), while a UE is in a sleep state for example, can be a desirable service for an MNO to offer a third Party Service Provider. For example, in some cases, the service can be useful when the third party service provider desires to send a single packet to the UE, and the third party service provider is not concerned with receiving a timely acknowledgement from the application, service, or transport layers. In other communication scenarios, however, it is recognized herein that buffering MT data in the MCN can cause problems within the network, and with the application, service, or transport layer protocols.

For example, support of buffering within the MCN often requires that the MCN have memory resources available to buffer any MT data that is addressed to a sleeping device. Thus, for example, if the MT data size is significant, then the memory requirements might be quite large, especially if buffering is required for numerous IoT devices. Additionally, it is recognized herein that complications may arise when a sleeping UE wakes up and attaches to new network elements (e.g., an MME or S-GW), while MT data is buffered in old network elements. In some cases, the new network elements must fetch the buffered data from the old network elements. Alternatively, the old network elements may "drop" the buffered data, which may mean that the third Party Server has to send the data again, for instance in cases in which the 3rd party server buffers data that is also buffered in the MCN.

It is further recognized herein that, in some cases, an AS/SCS wishes to broadcast (or multicast) data (or a trigger) to a group of UEs. The group of UEs may make use of various power savings functions, such as PSM and extended idle mode DRX (eDRX) for example. Thus, it is recognized herein that the AS/SCS (third party application server) may ensure that the group members are listening (e.g., not sleeping) when the data or trigger is broadcasted or multicast.

The MCN Background Data Transfer procedures described above, and in TS 23.682, a third party server (e.g., SCS/AS) to coordinate a data transfer with the PCRF. It will be understood that the terms SCS, AS, third party server, and third party application server can be used interchangeable herein, without limitation. It is recognized herein that the above-described background data transfer procedure might not account for when a given UE may be sleeping (e.g., using eDRX and/or PSM). It is further recognized herein that this lack of coordination between the background data transfer procedure and the UE's sleep modes may lead to large amounts of data being buffered in the MCN. For example, a large amount of data might be buffered if the SCS/AS sends a data transfer while the UE is in PSM.

Support of buffering within the MCN may also complicate the application, service, and transport layer protocols. For example, if MT data is buffered within the MCN, it is recognized herein that any re-transmission timers within the application, service, and transport layer protocols may need to be tuned so that acknowledgments are not expected sooner than the UE's longest possible sleep period. Once the UE wakes up, in some cases, re-transmission timers may be adjusted to expect acknowledgments more quickly. If the application, service, and transport layer protocols do not support tuning of the retransmission timers, in some cases, they may be incompatible with MCN buffering.

In such cases where the application, service, and transport layer protocols are incompatible with MCN buffering, data may be buffered by the third party until the UE exits its sleep state. This approach may require that the third party server and UE are time synchronized so that the third party server is aware of when the UE is asleep. This approach may also, or alternatively, require that the MCN notify the third party server when the UE is reachable. Further, data from the third party server is required to reach the UE before it returns to the sleep state. It is further recognized herein that time synchronization between a low cost IoT device and the third party server might not be practical, for instance in terms of the physical hardware that is required to keep time on the low cost IoT device, and in terms of the added messaging between the IoT device and the third party server.

As discussed above, the MCN can notify the third party server when a UE is reachable, or is about to become reachable. It is recognized herein that this approach may require the third party server to send the data before the UE determines to return to its sleep (or inactive) state.

Figure 7:
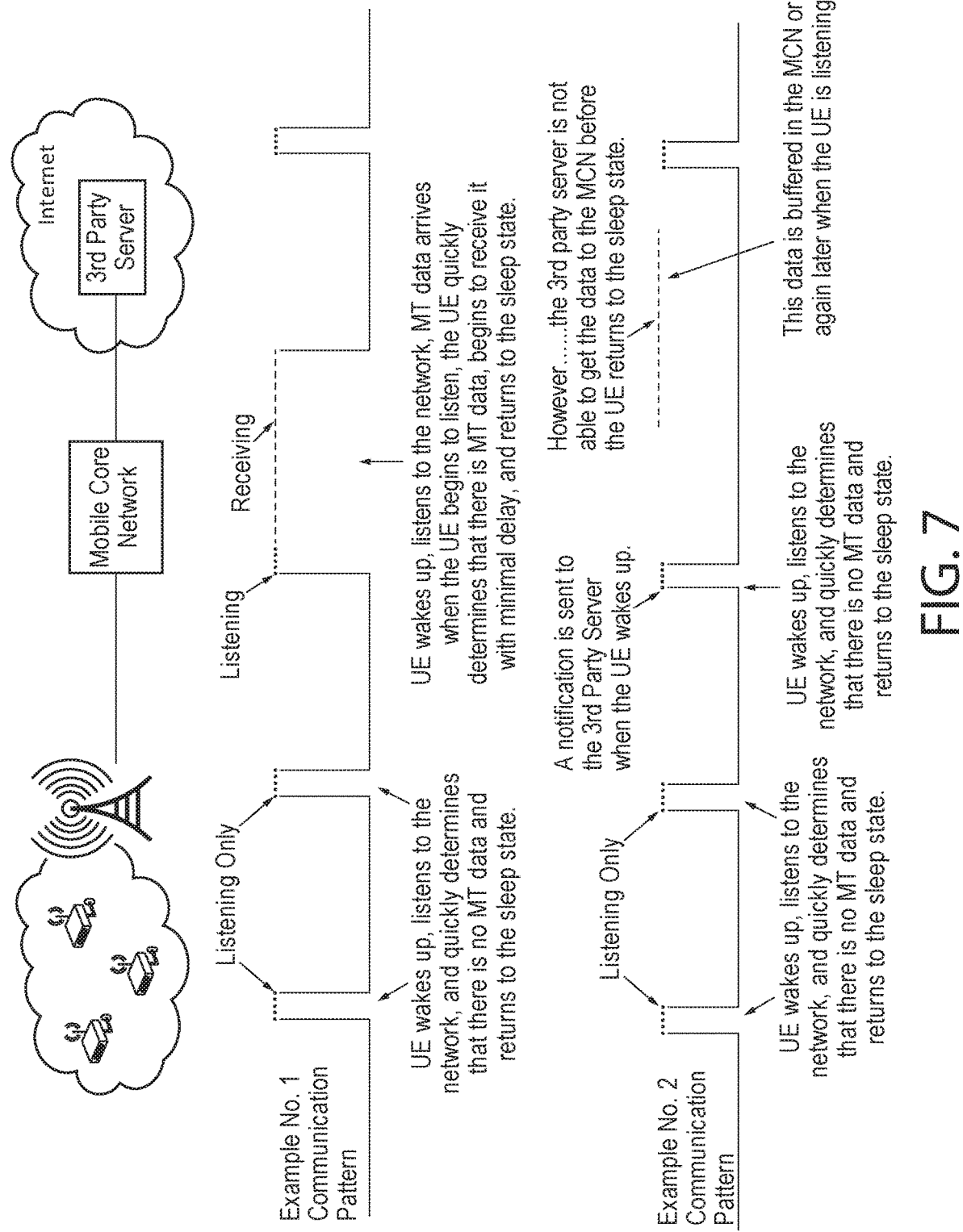
FIG. 7 is shows two example communication patterns.

Referring now to FIG. 7, an example of a preferred communication pattern (Example No. 1) and an example of nonpreferred communication pattern (Example No. 2) are shown. As shown, in Example No. 1, the UE sleeps for long periods of time and periodically wakes up to check if it needs to receive MT data. In the preferred example, the amount of time spent checking (or listening) for MT data is minimized. In the non-preferred example (Example No. 2), the UE wakes up and, because data from the third party server has not yet reached the MCN, the UE goes back to the sleep state. Meanwhile, the MT data reaches the MCN while the UE is sleeping. If the UE had stayed awake and listened longer, then the third party server's chances of success are increased, but the UE may consumer more power if it has to listen for longer periods to give the third party server more time to react to the wake up notification.

As described above, WiFi devices (STA's) may support a power save mode in which the device does not listen for downlink communication for periods of time. The amount of time that the UE stays in power save mode may be negotiated between the STA and the WiFi AP or WLC. While the STA is in power save mode, the AP or WLC may buffer any downlink data that is sent to the STA. It is recognized herein that currently an Application Server cannot influence various functions, such as, for example, how long the STA stays in power save mode or how much data should be buffered for the STA when the STA is in power save mode. It is further recognized herein that there are situations where the AS is the only actor that knows how long the STA may sleep before it needs to receive downlink data. But, in current approaches, the AS has no control over an STA's power save mode configuration, and thus power save mode cannot be optimally configured.

In various embodiments described herein, a third party application server may inform the network that it has data to send to a particular UE or group of UEs. Further, in various examples described in detail below, the MCN may information from the third party application server to ensure that the UE is awake, and that the UE is not allowed to enter in a sleep state before a data transfer completes.

In one example, the existing background data transfer procedure is optimized. For example, in some cases, the HSS and MEE is informed of the PCRF's background data transfer decisions so that the MME can ensure that the UE is reachable during a planned transfer. In another example, the transport, application, and service layer protocols are optimized, such that retransmissions timers within the protocol can account for the fact that the MCN may buffer MT data, and that the observed delay of MT packets between the third party application server and the UE may vary greatly if the UE is using long sleep cycles. Notifications from the MCN can be used by the third party application server to dynamically adjust the protocol's retransmission timers.

In another example, the "Availability after DDN failure" procedure is optimized to account for the case when a third party application server receives a notification that a UE is available, but sends data to the UE after the UE returns to the sleep state.

Various embodiments that are described herein may also apply to WiFi devices that use power save mode. For example, as described further below, an SCEF may have an interface to a WLC or WiFi AP that can be used to configure the STA's use of power save mode.

Buffering at a third party server is now discussed. In an example embodiment, if a mobile network operator (MNO) does not support in network buffering, it may allow a third party server (e.g., an SCS/AS) to inform the MCN that the third party server has data to send to a particular UE or group of UEs. The MCN may then wake the UE and keep the UE awake. Waking the UE and keeping the UE awake may include paging the UE, informing the UE that extended idle mode DRX is disabled for a certain time period, and/or informing the UE that the use of PSM is disabled for a certain time period. Keeping the UE awake may include informing network nodes, such as the MME and eNodeB for example, that the UE's RRC connection should not be suspended or that the UE's RRC connection should not be released. For example, the UE may receive a message from a network node that informs the UE that a previously scheduled sleep schedule should be aborted. If the data transfer is intended for a group of UEs, the MME may adjust the group's PSM or eDRX timers so that they are aligned with each other, and so that the group members are awake and available for downlink data transfer at the same time as each other.

In an example embodiment, when a third party server has data to deliver to a UE, it may inform the MCN that it has data available to send to a particular UE. It is recognized herein that the current "Background Data Transfer" request that is detailed in 3GPP TS 23.682 allows the third party server to indicate that it needs to send a certain volume of data to a number of UEs, but it does not allow the server to indicate a particular UE or group of UEs. By allowing the third party server to indicate a particular UE or group of UEs, it is recognized herein that the MCN may know in advance that the indicated UEs should be paged, prevented from entering a sleep state, kept awake, and/or prevented from initiating an RRC connection release. Knowledge of which UEs are recipients of data can be used to calculate when the data transfer should be performed. For example, a timer can be selected so that the members, for instance all the members, of a group are expected to be awake.

Figure 8:
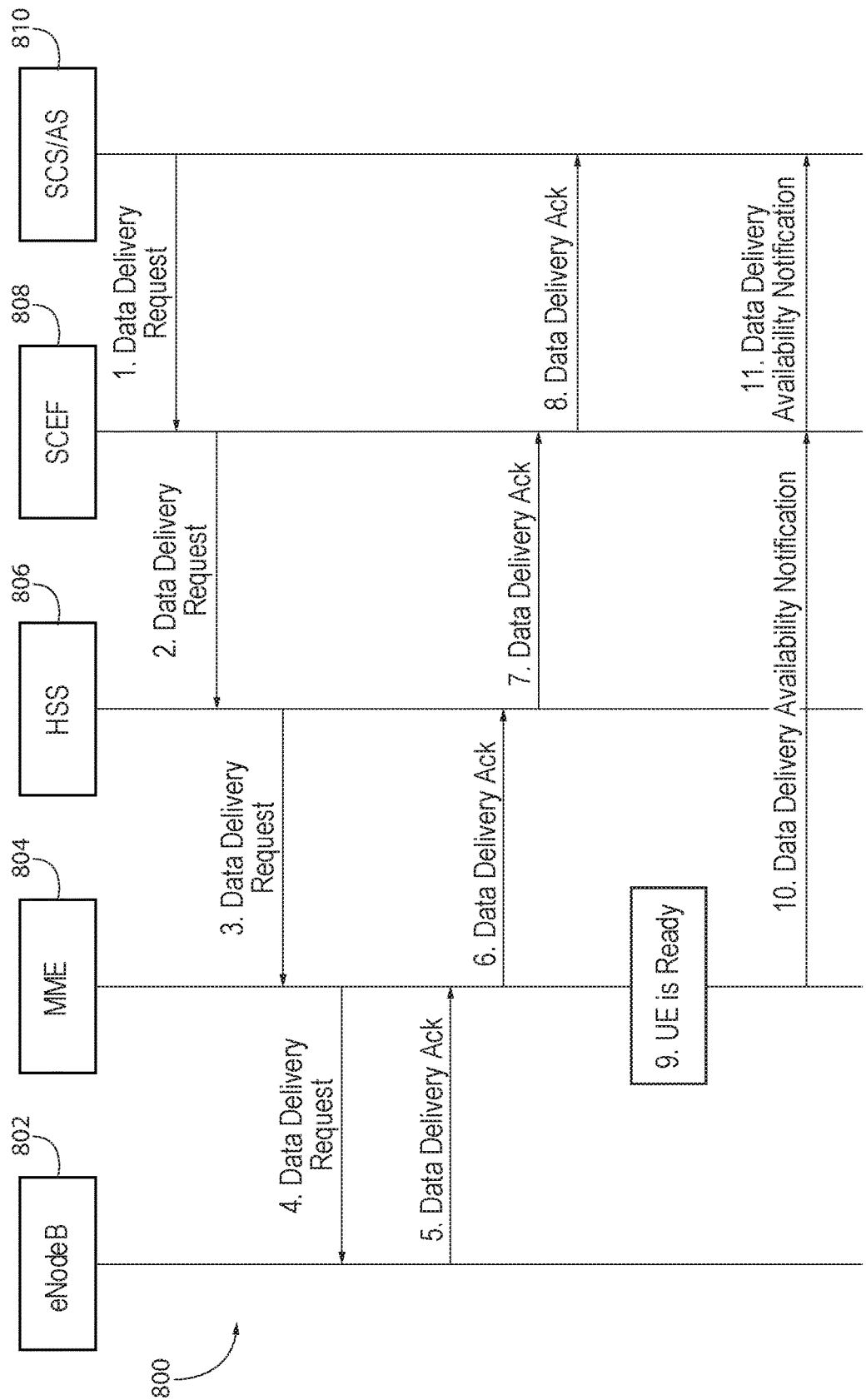
FIG. 8 is a call flow for a third party initiated data delivery in accordance with an example embodiment.
Figure 9:
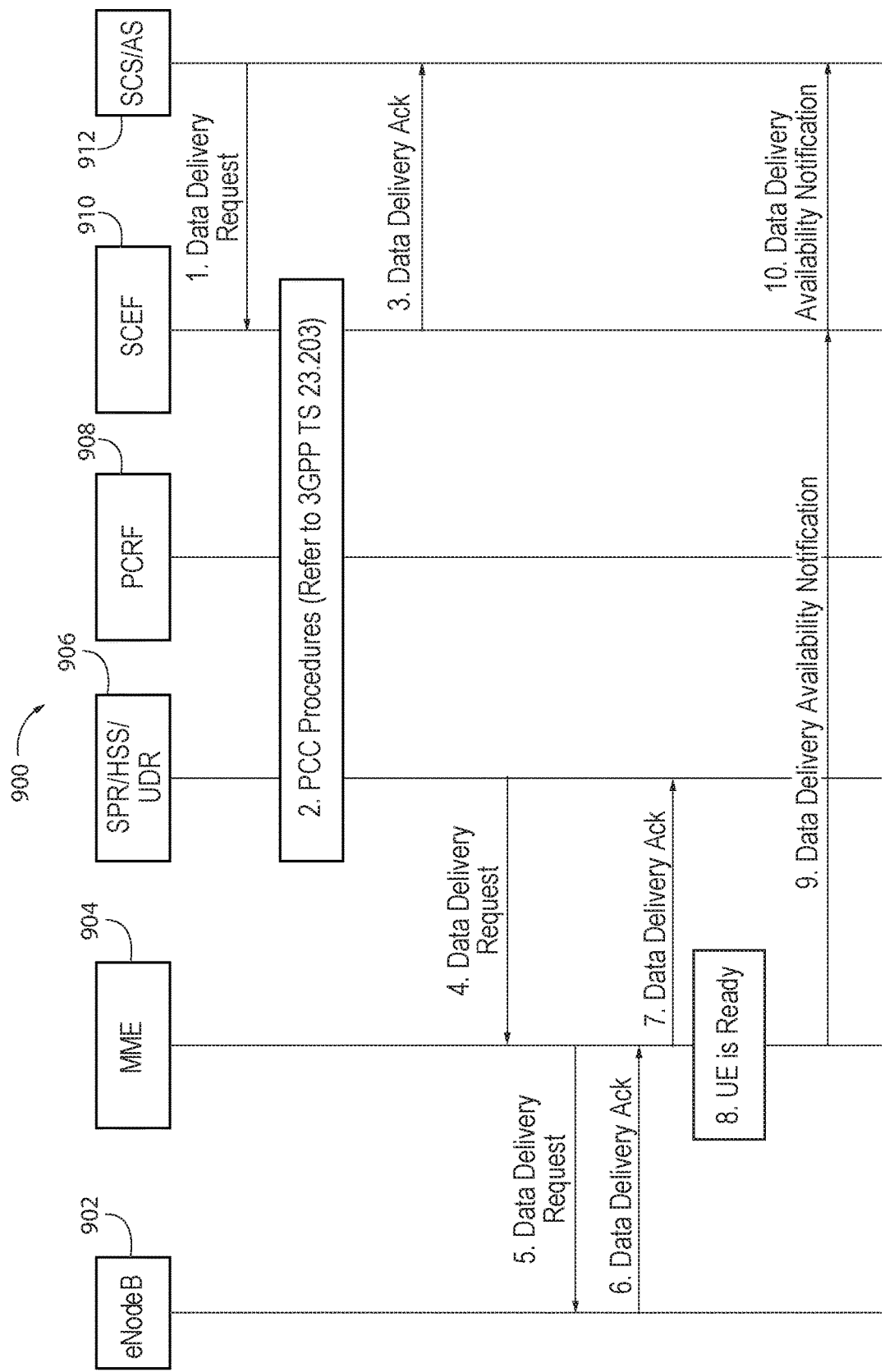
FIG. 9 is a call flow for an updated background data transfer in accordance with an example embodiment.

FIGS. 8 and 9 (described hereinafter) illustrate various embodiments for keeping at least one UE awake. In these figures, various steps or operations are shown being performed by one or more nodes, apparatuses, devices, servers, functions, or networks. For example, the apparatuses may operate singly or in combination with each other to effect the methods described herein. As used herein, the terms apparatus, network apparatus, node, server, device, entity, network function, and network node may be used interchangeably. It is understood that the nodes, devices, servers, functions, or networks illustrated in these figures may represent logical entities in a communication network and may be implemented in the form of software (e.g., computer-executable instructions) stored in a memory of, and executing on a processor of, a node of such network, which may comprise one of the general architectures illustrated in FIG. 12A or 12B described below. That is, the methods illustrated in FIGS. 8 and 9 may be implemented in the form of software (e.g., computer-executable instructions) stored in a memory of a network node, such as for example the node or computer system illustrated in FIG. 12C or 12D, which computer executable instructions, when executed by a processor of the node, perform the steps illustrated in the figures. It is also understood that any transmitting and receiving steps illustrated in these figures may be performed by communication circuitry (e.g., circuitry 34 or 97 of FIGS. 12C and 12D, respectively) of the node under control of the processor of the node and the computer-executable instructions (e.g., software) that it executes. It is further understood that the nodes, devices, and functions described herein may be implemented as virtualized network functions.

Referring in particular to FIG. 8, a network 800 includes an eNodeB 802, an MME 804, an HSS 806, an SCEF 808, and an SCS/AS 810 (which is also referred to as third party server). It will be appreciated that the example network 800 is simplified to facilitate description of the disclosed subject matter and is not intended to limit the scope of this disclosure. Other devices, systems, and configurations may be used to implement the embodiments disclosed herein in addition to, or instead of, a network such as the network 800, and all such embodiments are contemplated as within the scope of the present disclosure.

At 1, in accordance with the illustrated embodiment, the SCS/AS 810 sends a Data Delivery Request to the SCEF 808. The data delivery request may include, for example and without limitation, an SCS/AS Identifier; an SCS/AS Reference ID; the Volume per UE, an External Group Identifier, MSISDN, or External Group ID; a desired time window, a QoS/Message Priority. The SCS/AS Identifier may indicate which SCS/AS is initiating the request. The SCS/AS Reference ID is a transaction ID that is assigned by the SCS/AS. In an example, the Volume per UE is the approximate size of the desired data transfer. The External Group Identifier, MSISDN, or External Group ID may be used to identify the specific one or more UEs that will be the recipient of the data transfer. The desired time window indicates when then the SCS/AS would like to perform the data transfer. In some cases, absence of this value may be used to indicate that the SCS/AS would like to perform the data transfer as soon as possible. In an example, the QoS/Message Priority indicator may be an operator defined value that the SCS/AS may use to indicate the message priority, or importance. This information may be captured in the charging record so that the third party application server may be charged according to the indicated priority.

Still referring to FIG. 8, at 2, in accordance with the illustrated example, after authorizing the request, the SCEF 808 sends a Data Delivery Request message, which may include an SCEF Reference ID, the Volume per UE, External Group Identifier or MSISDN or External Group ID, and Desired time window, to the HSS 808. In this message, for example, the SCEF Reference ID is a transaction ID that is assigned by the SCEF. In an alternative example, the SCEF 808 may send this message directly to the MME 804. The SCEF 808 may learn the MME 804 by querying the HSS 806.

At 3, in accordance with the illustrated example, after authorizing the request, the HSS 806 sends a Data Delivery Request message, which may include the SCEF Reference ID, Volume per UE, IMSI, and Desired time window, to the MME 804. This message may notify the MME 804 that there is data buffered in the third party server 810 for at least one UE. Thus, the MME, which may comprise an apparatus, may receive a data delivery request message that indicates at least one user equipment (UE) that will be a recipient of data during a data transfer from a third party server. The data delivery request message may further indicate when the third party server would like to perform the data transfer. The MME may use this information to determine how to handle the UE(s) power savings mode (e.g., sleep or DRX mode) and when to page the UE. Thus, based on the data delivery request message, the MME may perform an action to ensure that the at least one UE is awake for the data transfer. For example, in some cases in which the intended recipients of the data transfer is a group of UEs, the action may ensure that each UE in the group is awake for the data transfer at the same time as each other.

In an example, performing the action to ensure that the at least one UE is awake comprises paging the at least one UE upon receiving the data delivery request message. For example, if the UE (or group of UEs) is not in an RRC connected state and the desired time window for the data window is approaching, or the third party server desires to perform the data transfer as soon as possible, the MME may initiate paging at the earliest paging occasion. In some cases, once the UE is paged and in an RRC connected state, then the MME may not initiate an RRC connection release until the desired time window has passed, the data transfer is complete, or a timer expires. Thus, after paging a given UE so that the UE is in a radio resource control (RRC) connected state, the MME may refraining from releasing the UE from the RRC connected state until at least one of a time window in the data delivery request message has passed, the data transfer is complete, or a timer expires.

In an example in which the UE is in PSM mode, the MME may prevent the UE from using the PSM mode until the desired time window has passed. Further, in accordance with an example, the MME may prevent given UE or group of UEs from entering a power savings mode (PSM) or extended idle mode discontinuous reception (eDRX) until a time window in the data delivery request message has passed. Preventing the UE from entering the PSM or eDRX can include rejecting a timer value that is proposed by the UE during a tracking area update. In another example, preventing the UE from entering the PSM or eDRX can include adjusting a timer associated with the UE, and adjusting a tracking area update timer associated with UE, such that the at least one UE is awake when the data transfer is performed. The MME may reject a UE's proposed active-timer value during a TAU. The MME may provide the UE with an indication that PSM is not allowed by rejecting the active timer or by providing a longer active-timer than what the UE proposed, for example, in order to ensure that the UE is not in PSM during the delivery attempt. In some cases, the MME 804 may also provide an indication to the UE that data is buffered for the UE at the third party server 810 or provide an indication to the UE that a data transfer, broadcast, or trigger is pending. Alternatively, the MME 804 may adjust the UE's active timer and TAU timer so that the UE will be awake when the data transfer is to be performed.

In some cases, in which the SCEF 808 provided an External Group ID, the message at 3 may include multiple IMSIs. Further, the message at 3 may be sent multiple times to the MME for each IMSI that is in the group that the MME is serving, and the message may be sent one or more times to each MME that serves a UE in the group.

Still referring to FIG. 8, in accordance with the illustrated example, at 4, the MME 804 may send a Data Delivery Request message, which may include the SCEF Reference ID, Volume per UE, IMSI, Desired time window, to the eNodeB. If the UE is in the RRC connected state, then the message at 4 may serve as a notification to the eNodeB that the eNodeB should not disconnect the UE's RRC connection until after the desired time window. If the UE is not in the RRC connected state, then the message may serve as a request to page the UE inside of the desired time window. Thus, the action that the MME performs to ensure that the UE is awake may include sending a data delivery request message to a radio access node (e.g., eNodeB 802, wherein the data delivery request message comprises a request to page the UE. It will be understood that eNodeB and radio access node may be used interchangeably herein, without limitation. In another example, the data delivery request message from the MME instructs the radio access node to maintain a radio resource control (RRC) connection with the at least one UE until after a time window in the data transfer request (e.g., from the third party server) has passed. As described further below, the data delivery message sent from the MME 804 may include a page, and the page may indicate, to the radio access node 802, that the data is buffered at the third party server 810.

Still referring to the illustrated example in FIG. 8, the message at 4 may be a paging message from the MME 804 to the eNodeB 802. The paging message may include, for example and without limitation: NAS ID for paging; TAI(s); UE identity based DRX index; Paging DRX length; list of CSG IDs for paging; Paging Priority indication; SCEF Reference ID, Volume per UE; IMSI; Desired time window. In some cases, the existing paging priority indicator may be used to indicate to the eNodeB 802 that the cause of the paging is not that downlink data is available in the MCN, but that the cause is that data is buffered (or available) for the UE at a third party server. In an alternative example embodiment, a new indicator may be used to indicate to the eNodeB 802 that the cause of the paging is not that downlink data is available in the MCN, but that the cause is that data is buffered (or available) for the UE at a third party server (e.g., the SCS/AS 810). For example, the new indicator may be added to the "Assistance Data for Paging" information element that is defined in 3GPP TS 36.413. During times of heavy congestion, for example, the eNodeB 802 may choose to not page a given UE at the next paging occasion even if there is new data stored in the MCN and ready for the UE. Instead, the eNodeB 802 may choose to delay paging the UE until the next paging occasion.

In an example, a new NAS message may be sent from the MME 804 to the UE to abort a previously approved PSM cycle. For example, if an active timer was approved at the last TAU, then the MME may send a message to the UE canceling the UE's use of PSM.

At 5, in accordance with the illustrated embodiment, the eNodeB 802 sends a Data Delivery Ack (SCEF Reference ID) to the MME 804. The acknowledgement may include an indication that, because the cause of the page is data that is buffered at the third party server 810, the eNodeB 802 will not page the UE at the UE's next paging occasion. Rather, in some cases, the eNodeB 802 may require that the MME 804 attempt the page later, and the eNodeB 802 may indicate to the MME 804 when to try again. In an alternative example, the eNodeB may indicate when it will attempt to deliver the page.

At 6, in accordance with the illustrated example, the MME 804 sends a Data Delivery Ack (SCEF Reference ID) to the HSS 806. At 7, the HSS 806 sends a Data Delivery Ack (SCEF Reference ID) to the SCEF 808. At 8, as shown, the SCEF 808 sends a Data Delivery Ack (SCS/AS Reference ID) to the SCS/AS 810.

At 9, in accordance with the illustrated example, the UE (or group of UEs) may be ready for the data transfer when it becomes RRC Connected, performs a TAU, an Attach, when the network disables the UE's use of PSM, or the UE disables the UE's use of extended idle mode DRX. At 10, the MME 804 may send a Data Delivery Availability Notification (SCEF Reference ID) to the SCEF 808. The MME 806 may send this notification when it determines that data from the third party buffer can now be sent to the UE. The MME may make this decision at various times. For example, the MME 806 may determine that data from the third party buffer can be sent to the UE when the UE enters RRC connected state. This may occur because the MME initiated paging of the UE. Typically, the MME may page the UE after data reaches the S-GW. The DDN message from the S-GW may cause the MME to initiate paging. In an example, the MME may initiate paging based on receiving the Data Delivery Request from the HSS. The page may cause the UE to enter the RRC connected state so that it is reachable for mobile terminated data.

In another example, the MME 806 may determine that data from the third party buffer can be sent to the UE when the UE performs a TAU or performs an attach, and requests the use of extended idle mode DRX during the TAU or attach. The network may disable the use of extended idle mode DRX, for example, by not providing extended idle mode DRX parameters in the TAU or attach response. In some cases, the TAU or attach response may include an indication that extended idle mode DRX is not accepted because a third party has buffered data for the UE. By disabling the use of extended idle mode DRX, the UE may be forced to use regular discontinuous reception as defined in detail in 3GPP TS 23.401. In an example, if the third party server 810 sends the buffered data while the UE is using regular DRX, the buffered data would not require extended buffering in a network node, such as the S-GW for example.

In yet another example, the MME 806 may determine that data from the third party buffer can be sent to the UE when the UE performs a TAU or performs an attach, and requests the use of PSM, for example, by providing an Active Time during the TAU or attach. The network may disable the use of PSM by not providing an Active Time in the TAU or attach response. The TAU or attach response may include an indication that PSM is not accepted because a third party has buffered data for the UE.

Still referring to FIG. 8, in accordance with the illustrated example, at 11, the SCEF 808 sends a Data Delivery Availability Notification (SCS/AS Reference ID) to the SCS/AS 810. The SCS/AS 810 may then begin to send the buffered data to the UE. After receiving the notification, the SCS/AS 810 can send data to the UE via a user plane connection, via SMS-SC, or via other control plane procedures using the SCEF 808. The SCS/AS 810 may later send a Data Delivery Complete message to the SCEF 808 to indicate when the data transfer is complete so that the SCEF 808 may know that the UE may be permitted to use low power modes again. For example, the message may include the SCS/AS Reference ID that was provided in the original Data Delivery Request (at 1) so that the SCEF 808 may know what operation was completed. The SCEF 808 may then provide the completion notification to the MCN. The completion message from the SCEF 808 may include the SCEF Reference ID that was provided in the original Data Delivery Request so that the MCN may know what operation was completed.

In some cases, after expiration of the time window, when the S-GW observes that data transfer has started, or that the requested data volume has been transferred, the S-GW or MME may inform the eNodeB that the UE no longer needs to be kept awake. Thus, the eNodeB may begin using other policies to determine when to end a UE's RRC connection.

In an example, the MCN may allow the UE to send an emergency NAS message to indicate that its battery is low and that it must terminate its RRC connection, suspend its RRC connection, use eDRX, or enter PSM. When a MCN node, such as the MME for example, receives such a message, the MME may inform the S-GW and the eNodeB so that the S-GW and eNodeB know that the previously requested data delivery must be canceled. A notification may also be sent to the SCEF so that the SCEF can inform the SCS/AS that the previous requested data delivery must be canceled. The SCEF may also indicate that the cause of the cancellation is a UE's low battery or power savings mode request.

Referring now to FIG. 9, extensions to the Background Data Transfer Procedure are now discussed. As described above, the background data transfer procedure that is described in 3GPP TS 23.682 may be modified, in accordance with an example embodiment, to ensure that the UE(s) that are the target of the data transfer are awake and able to receive the data within the requested time window.

As shown in FIG. 9, a network 900 includes an eNodeB 902, an MME 904, an SPR/HSS/UDR 906, a PCRF 908, an SCEF 910, and an SCS/AS 910 (which is also referred to as a third party server). It will be appreciated that the example network 900 is simplified to facilitate description of the disclosed subject matter and is not intended to limit the scope of this disclosure. Other devices, systems, and configurations may be used to implement the embodiments disclosed herein in addition to, or instead of, a network such as the network 900, and all such embodiments are contemplated as within the scope of the present disclosure. In accordance with the once a policy is created and approved by the PCRF 908, the SPR 906 provides a policy, for instance a transfer policy, to the HSS 906, and the HSS 906 provides the policy to the MME 904. When the time window that is associated with the policy is reached, or about to be reached, the MME 904 will keep the UE in the RRC connected state, prevent the UE from using PSM, and prevent the UE from using eDRX. Once the UE is available to perform the data transfer, the MME 904 may notify the SCEF 910.

Still referring to FIG. 9, at 1, in accordance with the illustrated example, the SCS/AS 912 sends a Data Delivery Request message, which may include the SCS/AS Identifier, SCS/AS Reference ID, Volume per UE, External Group Identifier or MSISDN or External Group ID and Desired time window, to the SCEF 910. This message may be a modified Background Data Transfer request. The background data transfer request may be modified to include the specific one or more UEs that will be involved in the data transfer(s). The background data transfer request may also be updated to include an indication that the UE(s) involved in the data transfer may be using PSM, eDRX, or other sleep modes, and that the SCS/AS 912 would like to be notified when the UE(s) are available.

At 2, after authorizing the request, the SCEF 910 selects any of the available PCRFs and triggers the Negotiation for the future background data transfer procedure with the PCRF 908. The PCRF 908 may respond to the SCEF 910 with the possible transfer policies and a reference ID. In an example embodiment, the SCEF 910 can indicate to the PCRF 908 that the UE(s) involved in the data transfer may be using PSM, eDRX, or other sleep modes, and that the SCEF 910 would like to be notified when the UE(s) are available. In some cases, this indication may be kept as part of the data transfer policy. In another example, the SCEF 910 may know that the UE(s) involved in the data transfer may be using PSM, eDRX, or other sleep modes via provisioning or a message from the SCS/AS 912. Further, at 2, the SCEF 910 may be provided with a Reference ID for the data transfer policy. At 3, in accordance with the illustrated example, the SCEF 910 forwards the parameters provided by the PCRF 908. This message may include the SCS/AS Reference ID. At 4, in accordance with the illustrated example, if the SPR is not co-located with the HSS, then the SPR may send the data transfer policy to the MME 904 along with the indication that the SCEF 910 would like to be provided with an indication when the UE(s) are available for the data transfer. It will be understood that the SPR and HSS may be co-located in a UDR style deployment. The data transfer policy may include an SCEF ID, an SCEF Reference ID, and an indication that the SCEF would like to be notified when the UE(s) associated with the policy can perform the data transfer. Alternatively, the SCEF 910 may send this transfer policy information directly to the MME 904. The SCEF 910 may learn the MME identity by querying the HSS 906. Thus, the MME may receive a transfer policy associated with the at least one user equipment, such that the action it performs to ensure the UE is awake is also based on the transfer policy. As described, the transfer policy may indicate whether one or more sleep modes are used by the at least one UE.

Referring also to FIG. 8, steps 5, 6, 7, 8, 9, and 10 of FIG. 9 are described with reference to FIGS. 4, 5, 6, 9, 10, and 11 of FIG. 8, respectively. In some cases, when the SCS/AS configures a monitoring event or makes a data delivery request, the SCS/AS may provide an estimate of how long it will need to prepare the data transfer after receiving an indication that the recipient UEs are available. The MME can use this information to determine how long in advance of the UEs becoming available to send the availability indication.

In an example, an SCS/AS and SCEF may request that it be notified when the UE becomes available after delivery of a packet fails. This is described above. In some cases, the UE may only be awake for a short time period. It is recognized herein that if the 3rd party server fails to send data to the S-GW before the UE returns to the sleep state, then the data delivery attempt may fail again. In order to help handle this situation, in accordance with one example, the SCS/AS and SCEF are allowed to configure this notification so that it will not clear until a MT packet is successfully sent. In other words, the MCN (e.g., MME) may send a notification each time the UE becomes reachable until a data packet is successfully sent to the UE.

Turning now to dynamically adjusting retransmission timers, in some cases, when buffering of data is supported in the MCN, the first packet that is sent by a third party server to a UE may experience a relatively large delivery delay. For example, if the UE's DRX cycle is 45 minutes long, the first packet could take as long as 45 minutes to reach the UE. It can be expected that, when the UE is awake, the packet will experience a much shorter delivery delay.

In some cases, when a data packet is buffered in the MCN, the third party server has no assurance that the packet is buffered in the network. In some examples, until the packet is acknowledged by the UE, the third party server does not know if the packet is buffered in the network or has failed to be delivered and has been lost. Thus, even when packets are buffered in the MCN, it is recognized herein that, in some cases, the third party server may need to buffer the same packet until it receives an acknowledgement from the UE. In some examples, the third party server cannot assume that the packet is buffered in the MCN and will be successfully delivered to the UE. Further, in some cases, it might not be efficient for a third party server to buffer large amounts of data in the MCN.

In an example embodiment, transport layer (e.g., TCP) and application layer (e.g., CoAP) protocols can be configured to dynamically adjust their retransmission timers to account for the possibility that the UE is using a long sleep cycle, and that the MCN may be buffering packets. In an example, a server may receive a message indicating a connection status associated with, for example, a mobile terminated device or UE. The message may include, for example, and without limitation, DRX or power savings mode (PSM) timers, an active timer value, a tracking area update (TAU) timer value, or a DRX cycle length. Based on the message, the server may configure the retransmission time of a protocol to a first value. The server may send a data packet to the at least one mobile terminated device, and use the protocol to retransmit the data packet a predetermined number of times in accordance with the first value. As mentioned above, the protocol, in some cases, may be the transmission control protocol (TCP) or constrained application protocol (CoAP). Further, the server may change the retransmission time of the protocol to a second value upon receiving data from the mobile terminated device, or upon receiving a notification from the network. Thereafter, the protocol may be used to retransmit the data packet a predetermined number of times in accordance with the second value. The notification from the network may include a timer value and/an availability notification. In some cases, the server may change the retransmission time back to the first value upon receiving a second notification from the network. The second notification may be a loss of connectivity notification related to the UE.

For example, if the UE's discontinuous reception (DRX) cycle is 45 minutes, the transport layer (e.g., TCP) or application layer (e.g., CoAP) protocol retransmission timers may initially be configured for a first value (e.g., 45 minutes). The MCN may inform the SCEF of the UE's DRX or PSM timers and the SCEF may inform the SCS/AS. Thus, the SCS/AS may receive a message indicating a connection status associated with the UE. The message may include, for example, and without limitation, a DRX time or power savings mode (PSM) timer. The message may further include an active timer value, a tracking area update (TAU) timer value, or a DRX cycle length. Once a transport layer or application layer acknowledgement is received, the initial retransmission timer of the protocol may be re-configured (changed) to a second value, for example, 1 second. Thus, retransmission time can be changed upon receiving data from the UE. It will be understood that the second value can vary as desired, and 1 second is used for purposes of example. In an example, after a predetermined number of unsuccessful delivery attempts or stretch of time when no packets are delivered to the UE, the third party server may assume that the UE is in a sleep state again and that initial retransmission timer may be set to 45 minutes again. Further, the SCS/AS may change the retransmission time of the protocol back to the first value (e.g., 45 minutes) upon receiving a notification from the network.

As described above, in an example, the third party server may independently determine when to adjust its initial retransmission timer. The third party server may use an availability notification from the MCN as a trigger to adjust the retransmission timer to a shorter value. Thus, the third party server may change the retransmission time of the protocol to a second value that is less than or greater than the first value based upon receiving a notification from the network. Furthermore, the notification may include a timer value that can be used as a recommended retransmission timer value or a value that can be used as a guide in picking a retransmission timer value. Thus, the notification may include the second value. In some cases, the third party server may use a loss of connectivity notification from an MCN node, such as the SCEF for example, as a trigger to adjust the retransmission timer to a second value that is longer than the first value. Furthermore, the notification may include a timer value that can be used as a recommended retransmission timer value or a value that can be used as a guide in picking a retransmission timer value. It will be understood that retransmission timers may be changed any number of times as desired in accordance with various embodiments described herein, and thus the first and second values referenced above are used for purposes of example.

In another example, rather than receiving a notification from the MCN, the third party server may query the SCEF or another MCN node before transmission to determine the state of the UE. The SCEF may tell the third party server how long the UE will be asleep. The third party server may then wait before sending the packet, or it may send the packet with a retransmission timer that is adjusted based on how long the SCEF said that UE will be asleep.

Turning now to buffering in the SCEF, the SCEF may provide an API to the SCS/AS that allows the SCS/AS to provide the data to be transferred, along with the Data Delivery Request, for example. The API call from the SCS/AS may be non-blocking and may specify a call back address/endpoint. The SCEF can then buffer the data and return an acknowledgement to the SCS/AE that it received the request and buffered the data along with some other possible information as well (e.g., expected wait time until the UE is available).

The SCEF may have a data plane interface with the P-GW (e.g., SGi Reference point). Once the UE becomes available, the SCEF may deliver the data over the user plane or control plane to the UE and can return a response (e.g., embedded in a new request) to the SCS/AS call back address indicating whether the request was successful. This response may be sent over a separate TCP connection (or separate HTTP/CoAP request/response pair). The SCS/AS may optionally acknowledge reception of the response. Thus, there might be no blocking and waiting by the SCS/AS, and the SCS/AS might have no re-transmission timers to manage. Rather, in this case, the SCEF can manage the problem of delivering the buffered data.

It is recognized herein that one example type of IoT traffic on the multicast/broadcast system can be a message that is supposed to trigger a group of UEs to report to the SCS/AS. In order to successfully deliver a trigger via an MBMS bearer, it is further recognized herein that the UEs in the group need to be ready to receive MBMS traffic at the time of the broadcast. But the UEs that receive IoT traffic may often use power savings functions, such as Power Savings Mode or extended idle mode DRX for example. If a UE is using PSM or eDRX during the broadcast transmission, it is recognized herein that the UE might not be available to receive MBMS traffic, and thus the trigger may be missed. When the SCS/AS issues a group message request to the SCEF, it also provides a message start time. When a group message is delivered, it is recognized herein that the SCEF should ensure that the group members stop using PSM and/or eDRX prior to the start time.

Referring generally to FIG. 6, it is noted that when MBMS is used to send data via the SCEF, as described in 3GPP TS 23.682, the MBMS Service Information (TMGI) may be provided to the group in step 5, in advance of any trigger occurring. In an example, step 12 will not be used to send the TMGI. It is recognized herein that if it were possible to individually address each UE in the group prior to sending the broadcast, the trigger would not be needed.

Referring to FIG. 6, in accordance with an example embodiment, to ensure that the group members are awake and listening to the broadcast at 13, the SCEF may provide the start time and External Group Identifier in the authorization request to the HSS, at 7. When the start time and External Group Identifier are included in the authorization request, the HSS may initiate an Insert Subscription Data procedure for each UE in the group to send the start time to the MME/SGSN. The MME/SGSN may then use this information to help ensure that the UE is available (e.g., not using PSM and/or extended idle mode DRX) in advance of the broadcast.

Thus, the SCEF may send the broadcast start time to the HSS in the group message authorization request. The HSS may receive the broadcast start time from the SCEF in the group message authorization request. The HSS may support modifying the Subscription Data of a group of UEs so that they may receive broadcast start time. In an example, for each UE in the group, the HSS may send the broadcast start time to the MME. Thus, the MME may receive the broadcast start time for each UE. The MME may modify the MM Context of each UE based on the received broadcast start time.

Additionally, in accordance with another example, the geographical area of the broadcast may be provided to the HSS and the MME. If the MME is not part of the geographical area where the broadcast is going to occur, then the HSS would know to not provide the start time to the MME, or the HSS may provide the geographical area to the MME, and the MME would know to not prevent the UE from using power savings functions if the broadcast is not going to be in the UE's geographical area.

Turning now to an example embodiment in which the above-described concepts are applied to a 5G MCN architecture that is based on NFV, the SCEF may be implemented as a NF that exposes an API that allows the third party server to indicate to the MCN that it has data to send to a particular UE. Alternatively, the node that exposes the API may be some other NF. When a UE uses a 5G power savings state, such as the NG_POWER-SAVING state, the API may allow the third party server to inform the MCN that the third party server would like to send data to the UE. The MCN may then notify the UE that it should leave the NG_POWER-SAVING or RRC Low Energy state because data is buffered at a third party server.

In some cases, when the UE is in NG_POWER-SAVING state, the UE may be expected to periodically leave the NG_POWER-SAVING state and listen to the network for a page or to perform some procedure with the network (e.g., similar to a TAU) to let the MCN know that the UE is temporarily reachable. The MCN may take this opportunity to page the UE so that the third party data can be buffered, or it can reply to the UE's message (e.g., the TAU message) and inform the UE that data is buffered for the UE in a third party server. The page or indication of buffered data from the MCN may cause the UE to not return to the NG_POWER-SAVING state.

When the UE is in RRC Low Energy state, the UE may be expected to periodically listen to the network for a page or perform some procedure with the network (similar to a TAU) to let the MCN now that the UE is temporarily reachable. The MCN may take this opportunity to page the UE so that the 3rd party data can be buffered or it can reply to the UE's message (i.e. the TAU message) and inform the UE that data is buffered for the UE in a third party server. The page or indication of buffered data from the MCN may cause the UE to leave the RRC Low Energy state.

In an example, the MCN Network Function that initiates paging of the UE and sending the indication that data is buffered for the UE may be a Mobility or Session Management network function. The NF may also inform the Core Network Anchor Point that a data transfer is pending for the UE and that the UE should not be told to use power savings modes, or states. The NF may inform the Core Network Anchor Point that a data transfer is pending for the UE and that the UE should be explicitly told to not use power savings modes. The UE can also be denied the use of power savings modes, or states. The Core Network Anchor Point may then pass this information to the RAN. Alternatively, the NF may tell the RAN directly.

The MM NF may also send a notification to SCEF NF that the UE is available for receiving downlink data. The SCEF could then forward the indication to the third party server, thus allowing the third party server to send its buffered data.

Turning now to background data transfers in 5G, the 5G MCN may include a policy engine NF. The SCEF NF may expose APIs that allow the 3rd party server to schedule background data transfers towards specific UE(s) with the MCN. The SCEF may forward the request for background data transfer to the policy engine NF and the MM or SM NF. The SCEF may use information from both the policy engine and the MM or SM NF(s) to determine the best time to schedule the background data transfer. For example, the policy engine NF may tell the SCEF a time window of when the background data should be performed. The time window from the policy engine may be based on when the MCN or RAT(s) that are associated with the UE are expected to be least congested. The SCEF may then communicate with the MM or SM NF to determine when the UE will be available for MT communication within the time window provided by the policy engine NF. For example, the SCEF may communicate with the MM or SM to determine when the UE will not be in a power savings saving state or mode.

Figure 10:
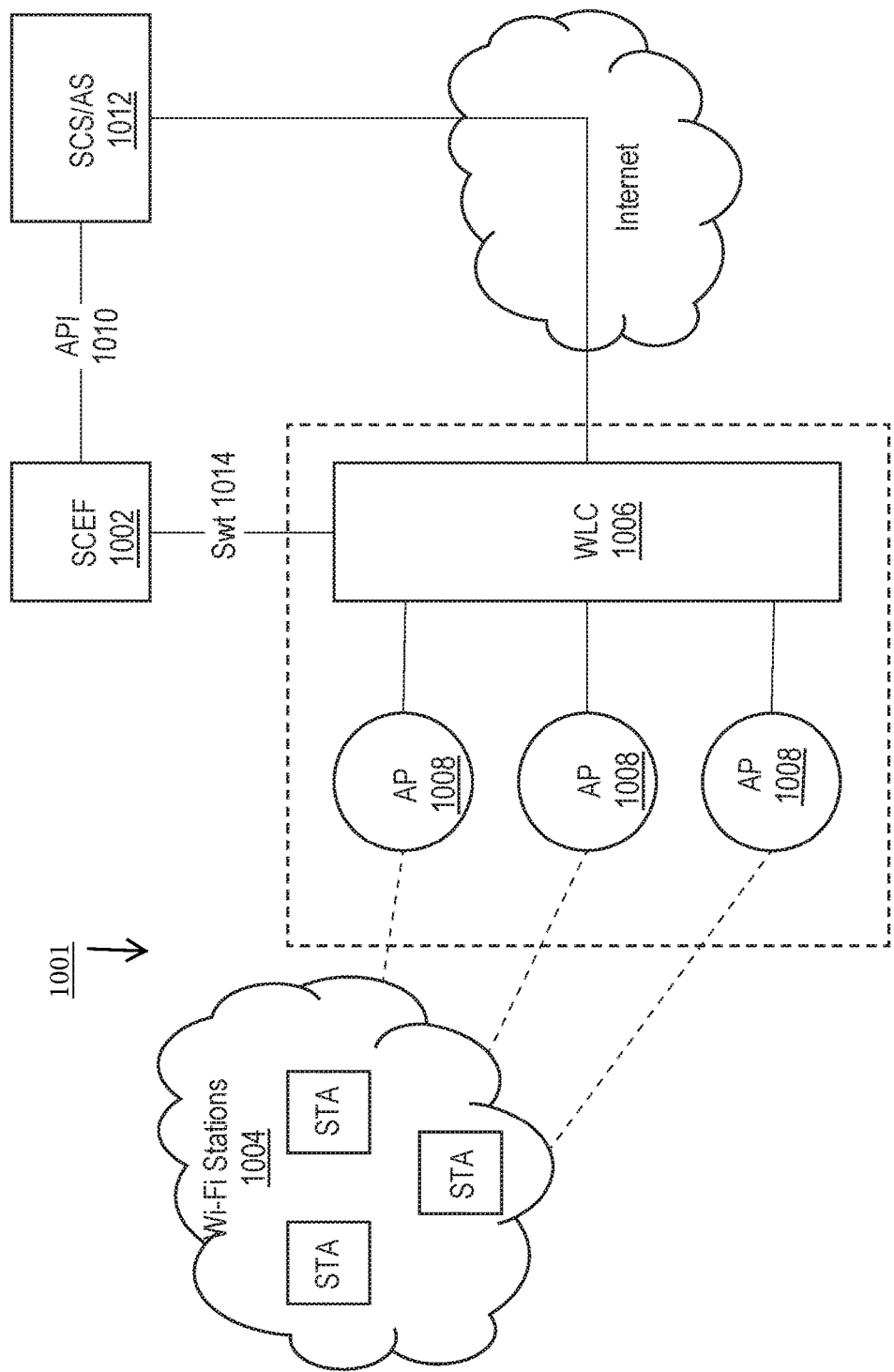
FIG. 10 shows an example SCEF in an example WiFi network.

Turning now to an example embodiment in which the above-described concepts are applied to WiFi, FIG. 10 shows an example of how an SCEF 1002 may be deployed with a WiFi network 1001. As shown, the network 1001 may include one or more WiFi stations (STAs) 1004 in communication with a wireless LAN controller (WLC) 1006 via one or more access points (Aps) 1008. The STAs 1004 shown in FIG. 10 may or may not be cellular capable UE's. The WLC 1006 and WiFi APs 1008 in FIG. 10 may represent a Trusted or Untrusted WiFi network 1001, where trusted and untrusted refers to the network's relationship with a mobile network operator.

Referring to FIG. 10, the SCEF 1002 may expose an API 1010 that allows an SCS/AS 1012 to configure a given STA's power save mode. For example, the API 1010 may allow the SCS/AS 1012 to identify one of the STAs 1004 (via IP Address, MAC address, or external identifier) and specify a desired amount of time that the STA should be allowed to sleep. As shown in FIG. 10, the SCEF 1002 may have an interface 1014 to the WLC. In FIG. 10 this interface 1014 is named Swt. The Diameter protocol may be used on the interface 1014. The interface 1014 may be used by the SCEF 1002 to provide the configuration information to the WLC 1006. The information may be used to determine the number of beacon intervals that the STAs 1004 may sleep. The API 1010 may also allow the SCS/AS 1012 to configure how much data, or how many frames, of downlink data may be buffered in the WLC 1006 or AP(s) 1004.

In some cases, the SCEF 1002 may also expose an API such as the Downlink Data Delivery Request API that is described above. The information that is provided in this API may be passed to the WLC/AP(s) and used to determine that the STA should not use power save mode, for example, and that the STA's power save mode should be ended at the next possible opportunity.

In an IMS network, an S-CSCF may connect to the WLC 1006 as the SCEF 1002 is shown to connect to the WLC 1006 in FIG. 10. The S-CSCF may use the Swt interface 1014 to configure the rate at which the STAs 1004 should exchange VoIP frames. Each STA may then be configured accordingly; thus enabling the STAs 1004 to sleep between packet exchanges. It should be understood that the WLC 1006 is an optional network element and that the SCEF 1002 may connect directly to AP(s) 1004. It should also be understood that the SCEF 1002 may be integrated with the WLC 1006 or an AP 1008.

As described above, a third party application server may inform the MCN that it has downlink data to transfer to a UE or STA. The MCN may then prevent the UE or STA from using low power modes, such as Power Save Mode, PSM, and/or eDRX, until the downlink data is sent to the UE or STA. Also, the network may page the UE so that the UE goes into the RRC connected state and is ready to receive the downlink data.

When the UE or STA is informed that a lower power mode such as Power Save Mode, PSM, and eDRX is not allowed because of an impending data transfer, the MCN may provide the UE or STA with an indication of why the low power mode is not allowed and how long it is not allowed for. For example, the indication may indicate that there is an AS that would like to send data to the UE, and that low power modes should not be allowed for a period of times (e.g., 5 minutes, etc.). When the UE or STA receives such an indication, a message such as an example message 1102 that is displayed in FIG. 11A may be displayed.

When the UE is paged so that the UE enters the RRC connected state in anticipation of an impending data transfer, the MCN may provide the UE with an indication of why the UE was paged. For example, the indication may indicate that there is an AS that would like to send data to the UE and that low power modes should be disabled for a period of time. When the UE or STA receives such an indication, a message such as an example message 1104 that is displayed in FIG. 11B may be displayed.

It will be understood that the GUIs 1102 and 1104 in FIGS. 11A and 11B, respectively, are presented by way of example, and the GUIs may be constructed as desired, such that configuration parameters can be viewed and altered as desired. It will be understood that the example user interfaces can be used to monitor and control alternative parameters as desired. It will further be understood that GUIs can provide a user with various information in which the user is interested via a variety of charts or alternative visual depictions.

Figure 12A:
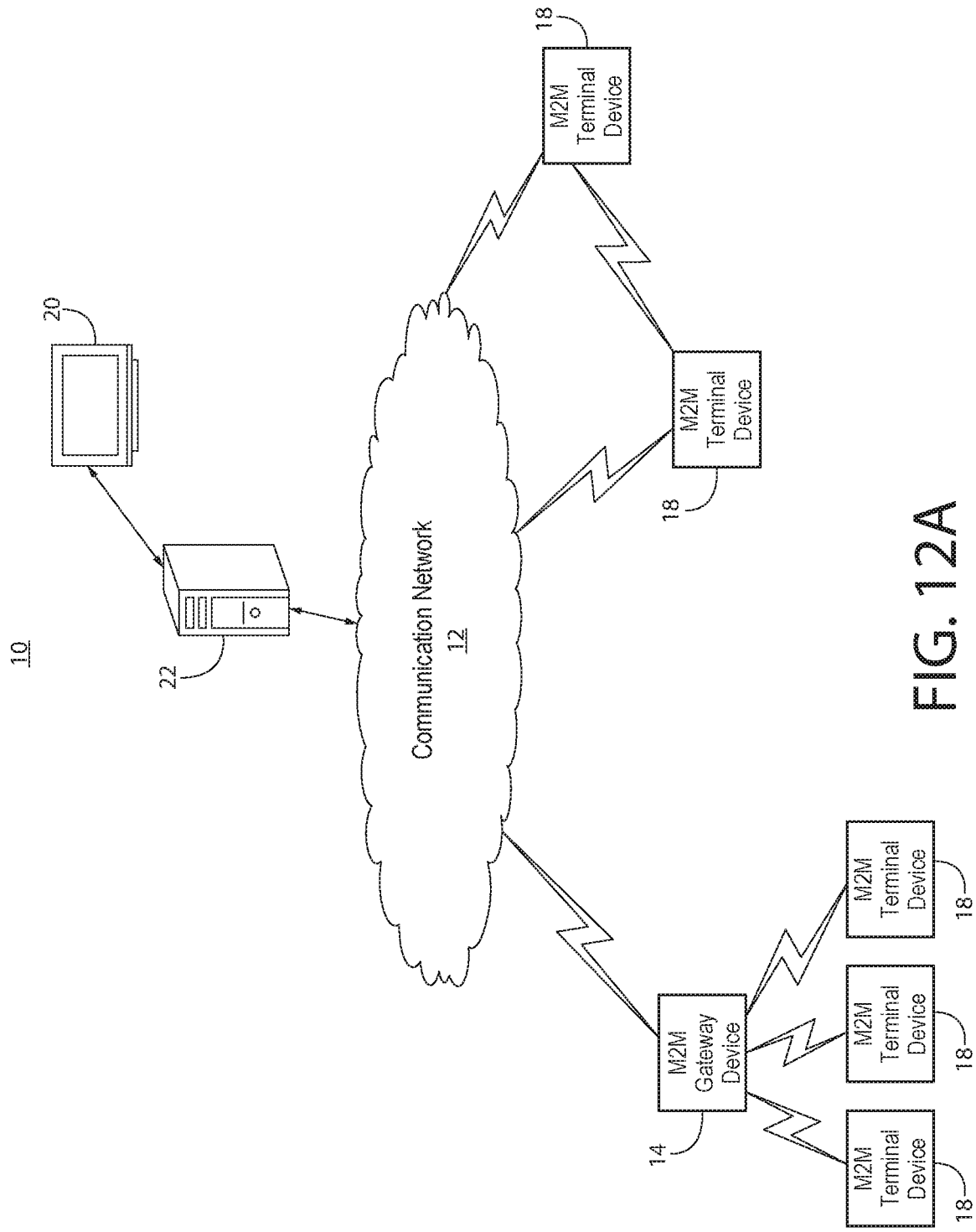
FIG. 12A is a system diagram of an example machine-to-machine (M2M) or Internet of Things (IoT) communication system in which one or more disclosed embodiments may be implemented.

FIG. 12A is a diagram of an example machine-to-machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway or M2M service platform may be a component of the IoT/WoT as well as an IoT/WoT service layer, etc. Any of the devices, functions, nodes, or networks illustrated in any of FIGS. 8-10 may comprise a node of a communication system such as the one illustrated in FIGS. 12A-B.

As shown in FIG. 12A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 12A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, devices, of the network. For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. A M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles personal digital assistants, health and fitness monitors, lights, thermostats, appliances, garage doors and other actuator-based devices, security devices, and smart outlets.

Figure 12B:
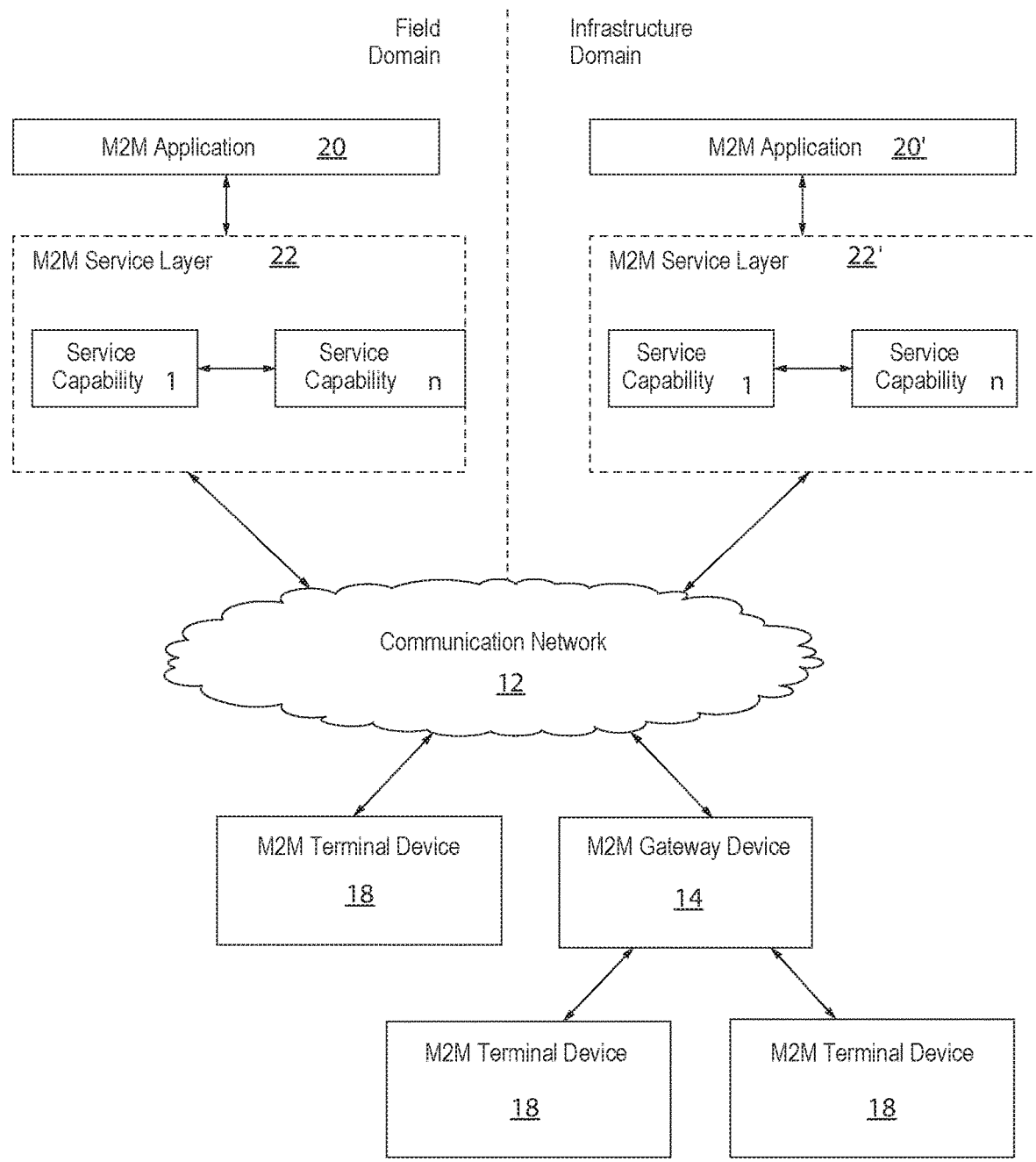
FIG. 12B is a system diagram of an example architecture that may be used within the M2M/IoT communications system illustrated in FIG. 12A.

Referring to FIG. 12B, the illustrated M2M service layer 22 in the field domain provides services for the M2M application 20, M2M gateway devices 14, and M2M terminal devices 18 and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Still referring to FIG. 12B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

Generally, a service layer (SL), such as the service layers 22 and 22' illustrated in FIGS. 12A and 12B, defines a software middleware layer that supports value-added service capabilities through a set of application programming interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented in a logical entity (e.g., software, computer-executable instructions, and the like) executing either on one or more standalone nodes in the network, including servers, computers, and other computing devices or nodes, or as part of one or more existing nodes. As an example, an instance of a service layer or component thereof may be implemented in the form of software running on a network node (e.g., server, computer, gateway, device, or the like) having the general architecture illustrated in FIG. 12C or 12D described below.

Further, the methods and functionalities described herein may be implemented as part of an M2M network that uses a Service Oriented Architecture (SOA) and/or a resource-oriented architecture (ROA) to access services, such as the above-described Network and Application Management Service for example.

Figure 12C:
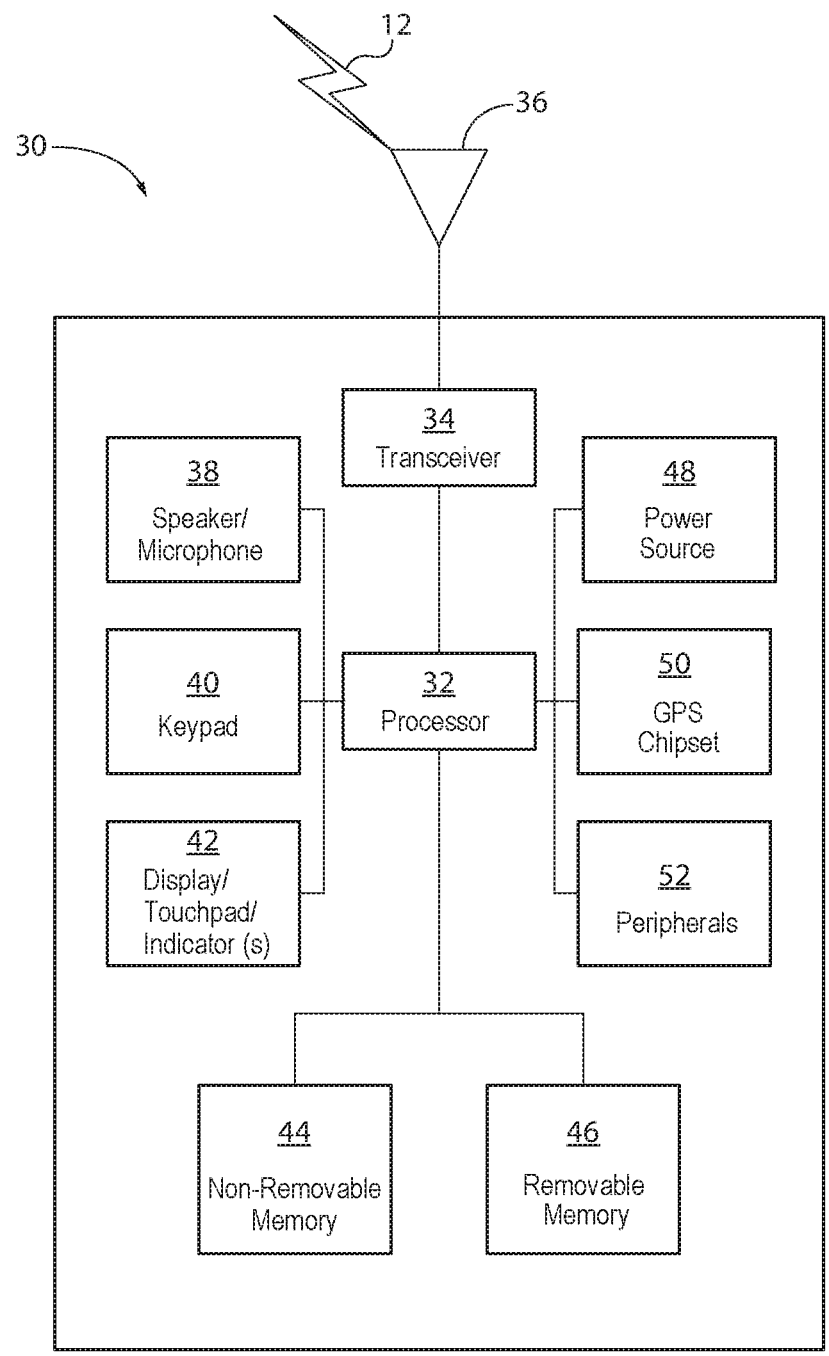
FIG. 12C is a system diagram of an example M2M/IoT terminal or gateway device that may be used within the communications system illustrated in FIG. 12A.

FIG. 12C is a block diagram of an example hardware/software architecture of a node of a network, such as one of the nodes, devices, functions, or networks illustrated in FIGS. 8-10 which may operate as an M2M server, gateway, device, or other node in an M2M network such as that illustrated in FIGS. 12A and 12B. As shown in FIG. 12C, the node 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements the notifications and triggers related thereto described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, and/or any other functionality that enables the node 30 to operate in a wireless environment. The processor 32 may be coupled to the transceiver 34, which may be coupled to the transmit/receive element 36. While FIG. 12C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

As shown in FIG. 12C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein (e.g., in FIGS. 8-10) and in the claims. While FIG. 12C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, devices, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 12C as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of a node or configure a node a UE (e.g., FIGS. 13-16), and in particular underlying networks, applications, or other services in communication with the UE. The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality, and/or wired or wireless connectivity. For example, the peripherals 52 may include various sensors such as an accelerometer, biometrics (e.g., fingerprint) sensors, an e-compass, a satellite transceiver, a digital camera (for photographs or video), a universal serial bus (USB) port or other interconnect devices, a vibration device, a television transceiver, a hands free headset, a Bluetooth® module, a frequency modulated (FM) radio unit, a digital music player, a media player, a video game player module, an Internet browser, and the like.

Figure 12D:
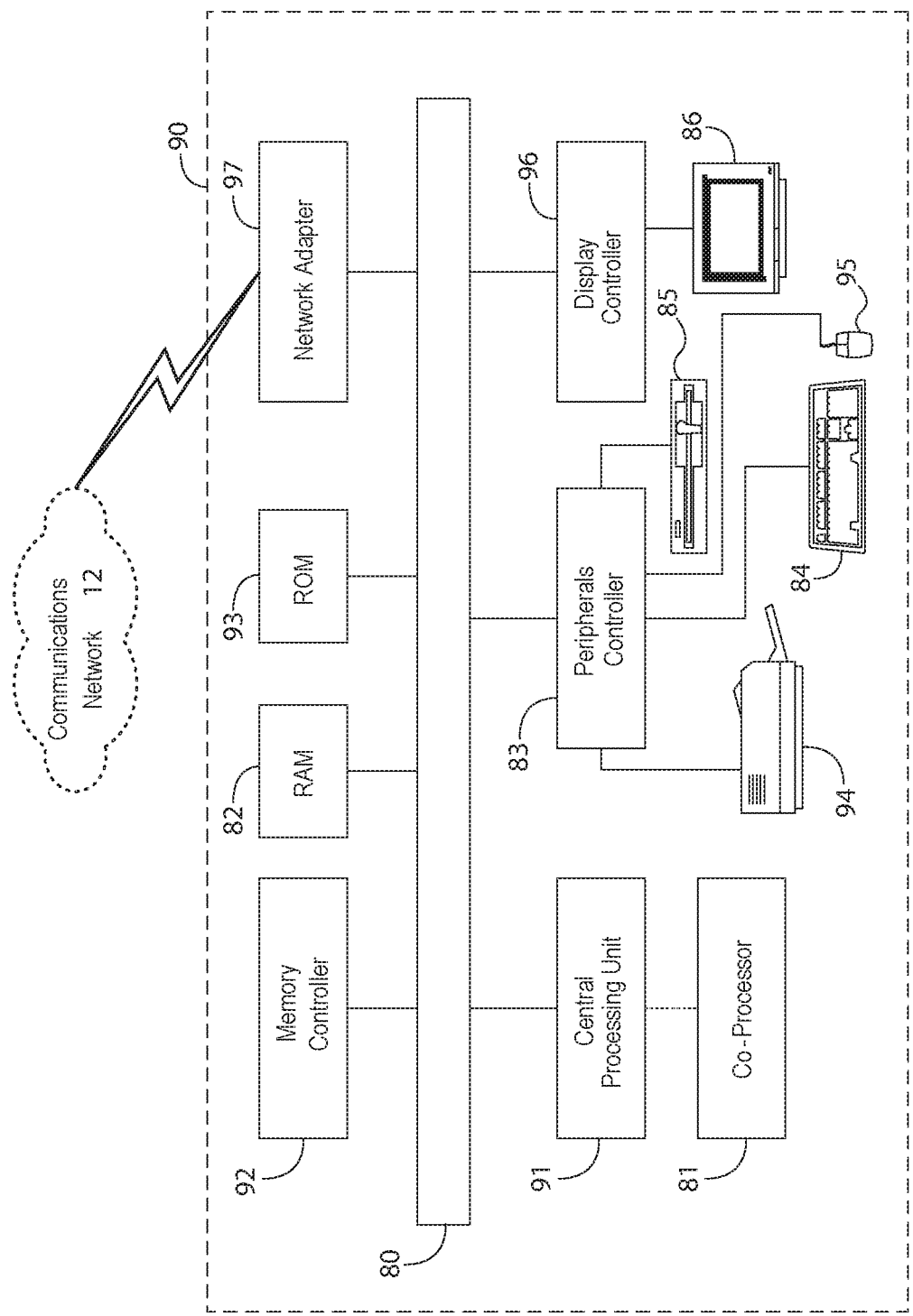
FIG. 12D is a block diagram of an example computing system in which aspects of the communication system of FIG. 12A may be embodied.

FIG. 12D is a block diagram of an exemplary computing system 90 which may also be used to implement one or more nodes of a network, such as nodes, devices, functions, or networks illustrated in FIGS. 8-10, which may operate as an M2M server, gateway, device, or other node in an M2M network such as that illustrated in FIGS. 12A and 12B. Computing system 90 may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, which performs additional functions or assists CPU 91. CPU 91 and/or coprocessor 81 may receive, generate, and process data related to the disclosed systems and methods for security protection.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97 that may be used to connect computing system 90 to an external communications network, such as network 12 of FIG. 12A and FIG. 12B, to enable the computing system 90 to communicate with other nodes of the network. The communication circuitry, alone or in combination with the CPU 91, may be used to perform the transmitting and receiving steps described herein (e.g., in FIGS. 8-10) and in the claims.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The following is a list of acronyms relating to service level technologies that may appear in the above description.

| | |
|---|---|
| AP | Access Point |
| API | Application Program Interface |
| AS | Application Server |
| CN | Core Network |
| DDN | Downlink Data Notification |
| DIFS | Distributed Inter-Frame Space |
| DRX | Discontinuous Reception |
| eDRX | Extended DRX |
| MCN | Mobile Core Network |
| MT | Mobile Terminated |
| NAS | Non Access Stratum |
| PDN | Packet Data Network |
| PSM | Power Savings Mode |
| RAU | Routing Area Update |
| RRC | Radio Resource Control |
| SCS | Service Capability Server |
| S-GW | Serving Gateway |
| SIFS | Short Inter-Frame Space |
| STA | Wi-Fi Station (e.g. a WiFi Device) |
| TAU | Tracking Area Update |
| UE | User Equipment |
| WLC | Wireless LAN Controller |

What is claimed:

1. An apparatus comprising a processor, a memory, and communication circuitry, the apparatus being connected to a network via its communication circuitry, the apparatus further comprising computer-executable instructions stored in the memory of the apparatus which, when executed by the processor of the apparatus, cause the apparatus to perform operations comprising:
   receiving a first data delivery request message that indicates at least one user equipment (UE) that will be a recipient of data during a data transfer from a third party server, the first data delivery request message further indicating when the third party server would like to perform the data transfer; and
   based on the first data delivery request message, performing an action to ensure that the at least one UE is prevented from releasing a radio resource control (RRC) Connection that can be used for the data transfer.

2. The apparatus as recited in claim 1, the apparatus further comprising computer-executable instructions which, when executed by the processor of the apparatus, cause the apparatus to perform further operations comprising:
   receiving a transfer policy associated with the at least one user equipment, such that the action is also based on the transfer policy,
   wherein the transfer policy indicates whether one or more sleep modes are used by the at least one UE.

3. The apparatus as recited in claim 1, wherein performing the action comprises paging the at least one UE upon receiving the first data delivery request message.

4. The apparatus as recited in claim 3, the apparatus further comprising computer-executable instructions which, when executed by the processor of the apparatus, cause the apparatus to perform further operations comprising:
   after paging the at least one UE so that the UE is in a radio resource control (RRC) connected state, refraining from releasing the at least one UE from the RRC connected state until at least one of a time window in the first data delivery request message has passed, the data transfer is complete, or a timer expires.

5. The apparatus as recited in claim 1, wherein performing the action comprises preventing the at least one UE from entering a power savings mode (PSM) or extended idle mode discontinuous reception (eDRX) until a time window in the first data delivery request message has passed.

6. The apparatus as recited in claim 5, wherein preventing the at least one UE from entering the PSM or eDRX comprises rejecting a timer value that is proposed by the at least one UE during a tracking area update.

7. The apparatus as recited in claim 5, wherein preventing the at least one UE from entering the PSM or eDRX comprises adjusting a timer associated with the at least one UE and a tracking area update timer associated with the at least one UE such that the at least one UE is in a radio resource control (RRC) Connected state when the data transfer is performed.

8. The apparatus as recited in claim 1, wherein performing the action comprises sending a second data delivery request message to a radio access node in the network, wherein the data delivery request message comprises a request to page the at least one UE.

9. A method performed by an apparatus connected to a network, the method comprising:
   receiving a first data delivery request message that indicates at least one user equipment (UE) that will be a recipient of data during a data transfer from a third party server, the first data delivery request message further indicating when the third party server would like to perform the data transfer; and
   based on the first data delivery request message, performing an action to ensure that the at least one UE is prevented from releasing a radio resource control (RRC) Connection that can be used for the data transfer.

10. The method as recited in claim 9, the method further comprising:
    receiving a transfer policy associated with the at least one user equipment, such that the action is also based on the transfer policy,
    wherein the transfer policy indicates whether one or more sleep modes are used by the at least one UE.

11. The method as recited in claim 1, wherein performing the action comprises paging the at least one UE upon receiving the first data delivery request message.

12. The method as recited in claim 11, the method further comprising:
    after paging the at least one UE so that the UE is in a radio resource control (RRC) connected state, refraining from releasing the at least one UE from the RRC connected state until at least one of a time window in the first data delivery request message has passed, the data transfer is complete, or a timer expires.

13. The method as recited in claim 9, wherein performing the action comprises preventing the at least one UE from entering a power savings mode (PSM) or extended idle mode discontinuous reception (eDRX) until a time window in the first data delivery request message has passed.

14. The method as recited in claim 13, wherein preventing the at least one UE from entering the PSM or eDRX comprises rejecting a timer value that is proposed by the at least one UE during a tracking area update.

15. The method as recited in claim 13, wherein preventing the at least one UE from entering the PSM or eDRX comprises adjusting a timer associated with the at least one UE and a tracking area update timer associated with the at least one UE such that the at least one UE is in a radio resource control (RRC) Connected state when the data transfer is performed.

16. The method as recited in claim 1, wherein performing the action comprises sending a second data delivery request message to a radio access node in the network, wherein the data delivery request message comprises a request to page the at least one UE.

\* \* \* \* \*